(12) United States Patent
Ozdas et al.

(10) Patent No.: US 11,861,787 B2
(45) Date of Patent: *Jan. 2, 2024

(54) 3-D GRAPHICS RENDERING WITH IMPLICIT GEOMETRY

(71) Applicant: Imagination Technologies Limited, Kings Langley (GB)

(72) Inventors: Cuneyt Ozdas, San Francisco, CA (US); Luke Tilman Peterson, San Francisco, CA (US); Steven Blackmon, San Francisco, CA (US); Steven John Clohset, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/081,623

(22) Filed: Dec. 14, 2022

(65) Prior Publication Data

US 2023/0186546 A1    Jun. 15, 2023

Related U.S. Application Data

(60) Continuation of application No. 17/185,086, filed on Feb. 25, 2021, now Pat. No. 11,562,526, which is a
(Continued)

(51) Int. Cl.
    *G06T 15/06* (2011.01)
    *G06T 15/50* (2011.01)

(52) U.S. Cl.
    CPC .......... *G06T 15/06* (2013.01); *G06T 15/506* (2013.01); *G06T 2210/12* (2013.01); *G06T 2210/21* (2013.01)

(58) Field of Classification Search
    CPC ....... G06T 15/06; G06T 15/005; G06T 15/50; G06T 15/08; G06T 15/506;
    (Continued)

(56) References Cited

U.S. PATENT DOCUMENTS

| 7,567,248 B1 | 7/2009 | Mark et al. |
| 7,586,494 B2 * | 9/2009 | Wang ............. G06T 15/04 345/581 |

(Continued)

FOREIGN PATENT DOCUMENTS

| CN | 101192310 A | 6/2008 |
| CN | 101751690 A | 6/2010 |

(Continued)

OTHER PUBLICATIONS

Ganacim F, Figueiredo LH, Nehab D. Beam casting implicit surfaces on the GPU with interval arithmetic. In2011 24th SIBGRAPI Conference on Graphics, Patterns and Images Aug. 2, 20118 (pp. 72-77). IEEE. (Year: 2011).*

(Continued)

*Primary Examiner* — Xiao M Wu
*Assistant Examiner* — Scott E Sonners
(74) *Attorney, Agent, or Firm* — Potomac Law Group, PLLC; Vincent M DeLuca

(57) ABSTRACT

Aspects relate to tracing rays in 3-D scenes that comprise objects that are defined by or with implicit geometry. In an example, a trapping element defines a portion of 3-D space in which implicit geometry exist. When a ray is found to intersect a trapping element, a trapping element procedure is executed. The trapping element procedure may comprise marching a ray through a 3-D volume and evaluating a function that defines the implicit geometry for each current 3-D position of the ray. An intersection detected with the implicit geometry may be found concurrently with intersections for the same ray with explicitly-defined geometry, and data describing these intersections may be stored with the ray and resolved.

18 Claims, 12 Drawing Sheets

Related U.S. Application Data division of application No. 14/202,722, filed on Mar. 10, 2014, now Pat. No. 10,970,912.

(60) Provisional application No. 61/787,884, filed on Mar. 15, 2013, provisional application No. 61/783,754, filed on Mar. 14, 2013.

(58) Field of Classification Search
CPC ............ G06T 2210/12; G06T 2210/36; G06T 2215/12; G06T 17/005; G06T 17/20
See application file for complete search history.

(56) References Cited

U.S. PATENT DOCUMENTS

| | | | |
|---|---|---|---|
| 2009/0262132 A1 | 10/2009 | Peterson et al. | |
| 2009/0322752 A1 | 12/2009 | Peterson et al. | |
| 2010/0045675 A1 | 2/2010 | Wyborn et al. | |
| 2010/0231589 A1 | 9/2010 | Salsbury et al. | |
| 2010/0328310 A1 | 12/2010 | Peterson et al. | |
| 2011/0267347 A1 | 11/2011 | Purcell et al. | |
| 2013/0265310 A1* | 10/2013 | Hirtzlin | G06T 15/60 345/426 |

FOREIGN PATENT DOCUMENTS

| | | |
|---|---|---|
| CN | 101819684 A | 9/2010 |
| CN | 102037497 A | 4/2011 |
| CN | 102184517 A | 9/2011 |
| CN | 102282591 A | 12/2011 |
| CN | 102947865 A | 2/2013 |
| EP | 2437399 A | 4/2012 |
| WO | 2012140360 A1 | 10/2012 |

OTHER PUBLICATIONS

Singh JM, Narayanan PJ. Real-time ray tracing of implicit surfaces on the Gpu. IEEE transactions on visualization and computer graphics. Apr. 17, 2009;16(2):261-72. (Year: 2009).*

Porumbescu SD, Budge B, Feng L, Joy KI. Shell maps. ACM Transactions on Graphics (TOG). Jul. 1, 2005;24(3):626-33. (Year: 2005).*

Manter et al; "Interactive Landscape Visualization Using GPU Ray Casting", Proceedings of the 4th International conference on Computer graphics and interactive techniques in Australasia and Southeast Asia, 2006, S. 117-126.

Tevs, et al; "Maximum Mipmaps for Fast, Accurate, and Scalable Dynamic Height Field Rendering"; Proceedings of the 2008 symposium on Interactive 3D graphics and games, I3E '08; S. 183-190.

Porumbescu et al; "Shell Maps," ACM Transactions on Graphics (TOG); Institute for Data Analysis and Visualization; vol. 24, No. 3, 2005.

Szirmay-Kalos et al., "Displacement Mapping on the GPU"; Computer Graphics Forum, vol. 27, No. 6, The Eurographics Association and Blackwell Publishing Ltd 2008.

Hirche et al. "Hardware accelerated per-pixel displacement mapping," Proceedings of Graphics Interface 2004. Canadian Human-Computer Communications Society, 2004.

Djeu et al., "Razor: An Architecture for Dynamic Multiresolution Ray Tracing," University of Texas at Austin Department of Computer Sciences, Technical Report #07-52 Jan. 24, 2007.

Gois et al., "Curvature-driven Modeling and Rendering of Point-Based Surfaces" SIGGRAPH 2006 19th Brazilian Symposium on Computer Graphics and Image processing pp. 27-36.

R-LODs: Fast LOO-Based Ray Tracing of Massive Models, S.E. Yoon, et al. The Visual Computer {Feb. 17, 2006).

Woop et al., "RPU: A Programmable Ray Processing Unit for Realtime Ray Tracing," ACM Transactions on Graphics (TOG), vol. 24, Issue 3, (Jul. 2005), Proceedings of ACM SIGGRAPH 2005, session: Hardware rendering, pp. 434-444, 2005.

Zhao et al. "Voxels on Fire" IEEE Visualization Oct. 2003. 19-24 2003.

Friedrich, H.: Ray Tracing Techniques for Computer Games and Isosurface Visualization. Thesis, University of Saarland, Saarbrucken, Germany, published on Aug. 3, 2012; researched on the internet on Jun. 8, 2015, URL: http://scidok.sulb.uni-saarland.de/volltexte/2012/4917/.

Online encyclopedia "Wikipedia", article about "Bounding Volume Hierarchy" dated Feb. 13, 2013, [researched on Jun. 8, 2015].

Singh et al., "Real-Time Ray-Tracing of Implicit Surfaces on the GPU," Technical Report:IIIT/TR/2007/72; IEEE Transactions on Visualization and Computer Graphics, vol. 16, No. 2, pp. 261-272, 2009.

Ganacim et al., "Beam Casting Implicit Surfaces on the GPU with Interval Arithmetic," 24th SIGGRAPH Conference on Graphics, Patterns, and Images, IEEE, pp. 72-77, 2011.

(NPL documents in parent applications).

* cited by examiner

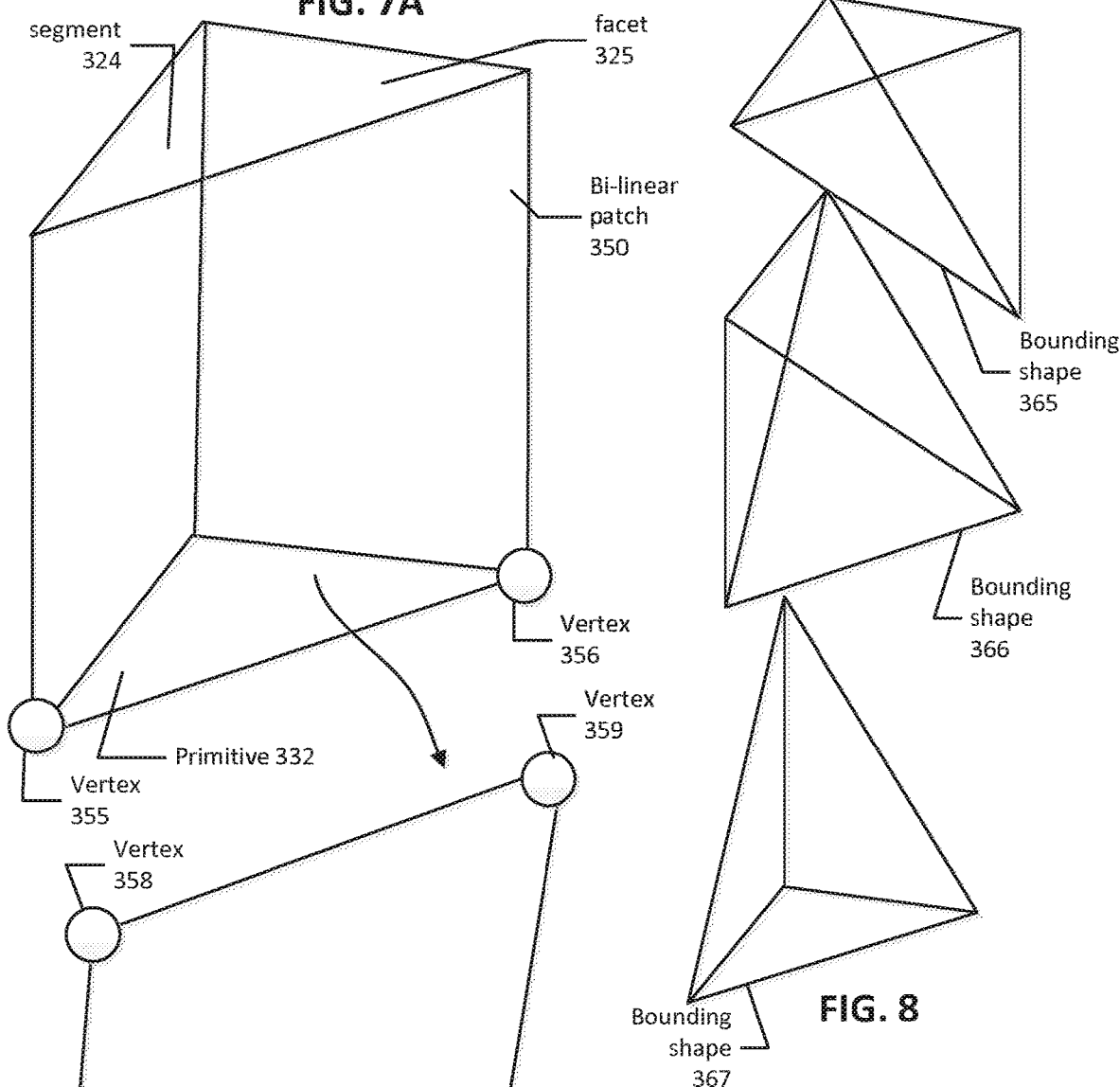

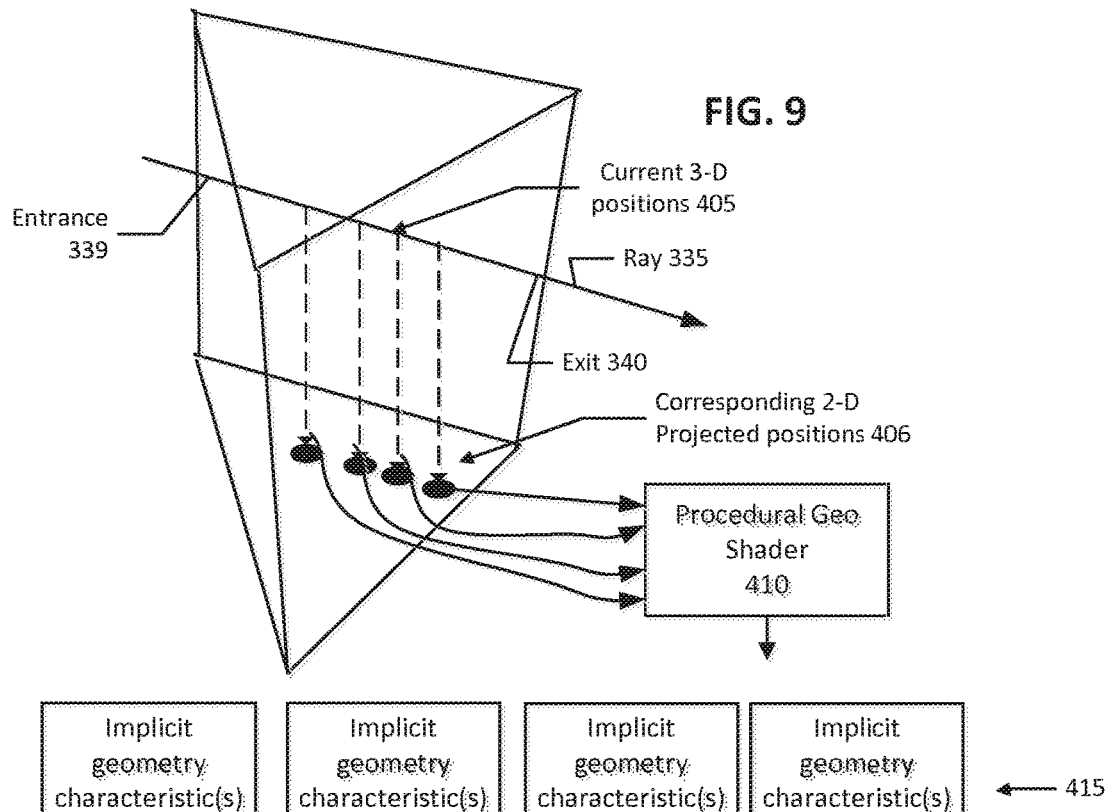
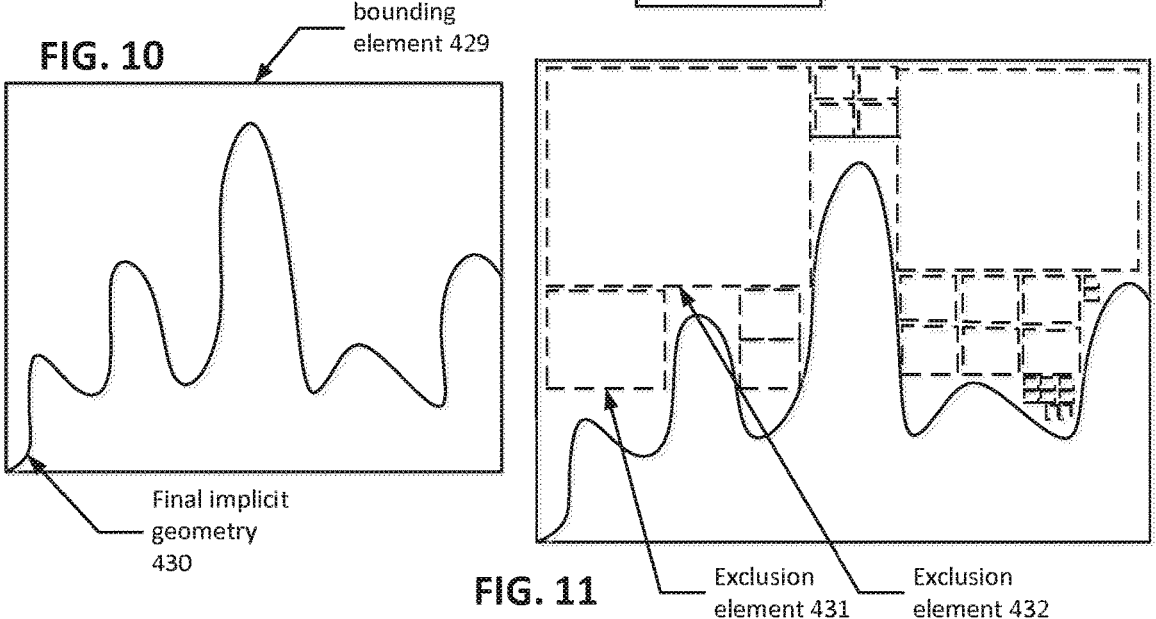

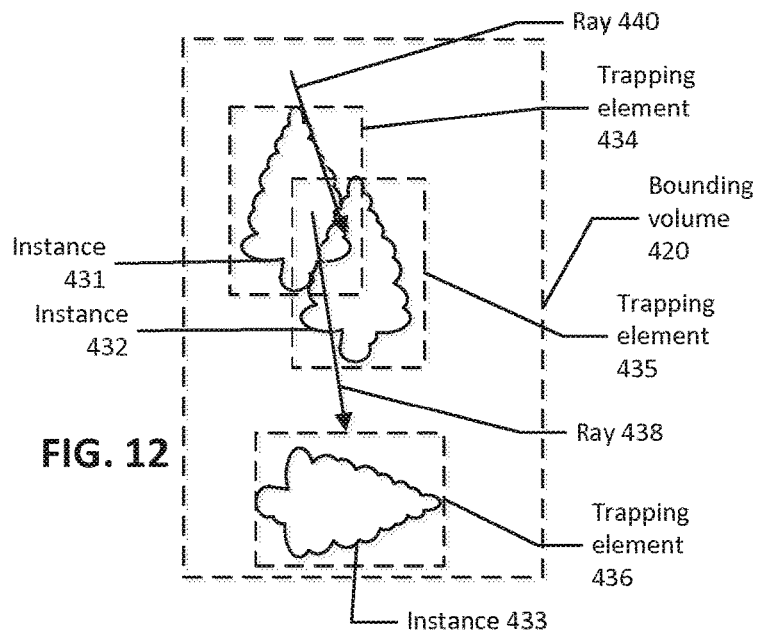
FIG. 12
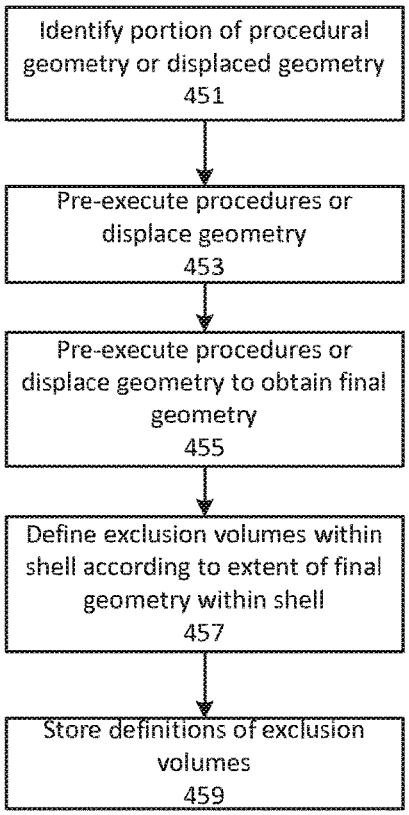
FIG. 13
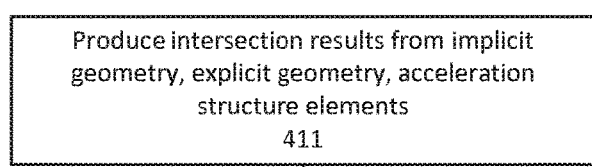
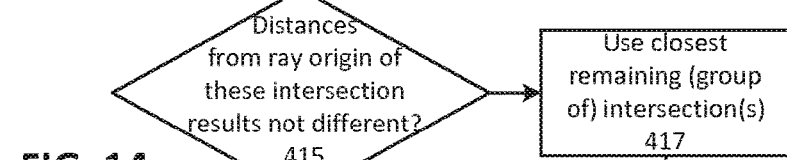
FIG. 14
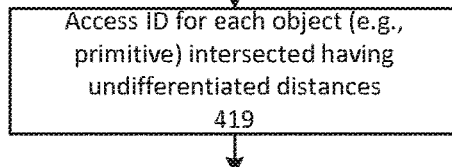
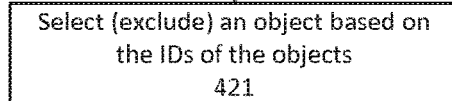
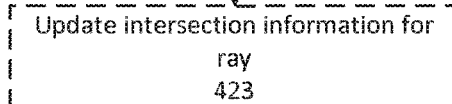
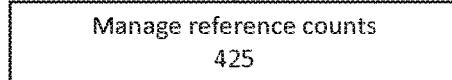
FIG. 15
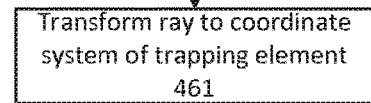
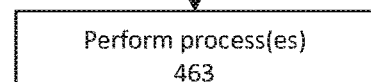
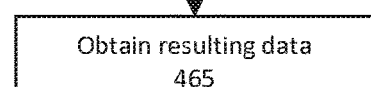
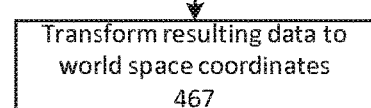

3-D GRAPHICS RENDERING WITH IMPLICIT GEOMETRY

CROSS REFERENCE TO RELATED APPLICATIONS

This application claims priority from U.S. Provisional Patent Application No. 61/783,754, entitled, "3-D GRAPHICS RENDERING WITH IMPLICIT GEOMETRY", filed on Mar. 14, 2013, and from U.S. Provisional Patent Application No. 61/787,884, entitled, "METHODS AND APPARATUS FOR REFACTORING A MODULAR RENDERING SYSTEM", filed on Mar. 15, 2013, which are incorporated by reference herein in their entireties.

BACKGROUND

Field

The following relates to ray tracing and in a specific application, ray tracing of computer graphics using displaced geometry.

Related Art

Rendering photo-realistic 2-D images from 3-D scene descriptions with ray tracing is known in the computer graphics arts. Ray tracing usually involves obtaining a scene description composed of geometric shapes, which describe surfaces of structures in the scene. Virtual rays of light are traced into the scene from a view point ("a camera"); each ray is issued to travel through a respective pixel of the 2-D representation, on which that ray can have an effect. The rays are tested for intersection with the geometric shapes to identify a closest intersection for each ray, if any.

These geometry shapes can be composed of primitives, such as triangular primitives. Representing a shape using triangular primitives provides a representation that can be consumed easily by some ray tracing renderers, and testing rays for intersection with triangles can be accomplished according to a variety of algorithms. However, for high quality rendering, e.g., to produce HD resolution images from a virtual 3-D scene, such as for a high-quality video game or an animation, detailed object models are beneficial. A detailed object model defined only using triangular primitives can consume a great deal of memory, compared with other representations. For example, representing a smoothly curving surface of an object using only triangular primitives generally would consume comparatively more memory than a spline-based representation. Another example is terrain features of a landscape. For example, representing a realistic mountain range using only triangular primitives may be memory-intensive, as many finely detailed features are required.

Displacement mapping is a technique that can be used to address these situations. Displacement mapping refers to displacing defined geometry data in one or more directions so that the geometry that is ultimately used to render the 3-D scene is modified according to the displacement strategy. This geometry can be considered displaced geometry. In ray tracing, rendering using displaced geometry involves testing displaced geometry for intersection. This is in contrast to bump mapping, which involves testing rays for intersection with source geometry and then upon identifying an intersection, a bump mapping process can be executed. Thus, bump mapping requires less computation for intersection testing, because rays are tested for intersected with simplified source geometry, not displaced geometry that might have many more primitives. However, bump mapping allows a more limited set of behaviors to be realized.

SUMMARY

In one aspect, a method of testing a ray for intersection with an implicit surface comprises entering a ray into a surface of a shell bounding a 3-D volume. The shell defines a maximum extent for implicitly-defined geometry within the shell. The method comprises iteratively stepping a current 3-D position of the ray along its path through the 3-D volume defined by the shell. For each current 3-D position, the current 3-D position of the ray is projected to a current 2-D position on an explicitly-defined surface bounded in the shell and data for the implicitly-defined geometry at the current 3-D position is produced using the current 2-D position on the explicitly-defined surface. The ray is characterized as either hitting or missing the implicitly-defined geometry at the current 3-D position, using the produced data. Ray data structures can store data produced for an intersection detected with the implicitly-defined geometry. The intersection can be expressed initially in a referenced coordinate system, and transformed into a global coordinate system for comparison with other detected intersections.

A bounding element can enclose the shell. The bounding element can be identified with a flag that indicates that bounding element should be traversed using an implicit-geometry intersection. A step size of the stepping can be varied. The step size can be set based on a ray differential or a level of detail indication. A set of volume exclusion elements can be defined in the bounding element, which each exclude a portion of the 3-D volume between the bounding element and an extent of the implicit geometry. The set of volume exclusion elements can be defined during a pre-execution step and stored in association with an acceleration structure for a 3-D scene. These are example aspects included in the detailed description that follows.

BRIEF DESCRIPTION OF THE DRAWINGS

FIG. 7A depicts a sub-volume of the example shell of FIG. 6;

FIG. 7B depicts a bi-linear patch that can be used to define sub-volumes of the example shell;

FIG. 8 depicts a set of shapes that can be used to define a sub-volume of the example shell;

FIG. 9 depicts an example of traversing a sub-volume and projecting current 3-D positions of the ray to a 2-D position in order to determine implicit geometry characteristic(s);

FIG. 10 depicts an example of an implicitly defined final geometry surface within a bounding element;

FIG. 11 depicts an example of volume exclusion elements formed within the bounding element, based on the final geometry surface of FIG. 10;

FIG. 12 depicts a situation where instances of geometry are enclosed in a trapping element FIG. 13 depicts a process of pre-execution of geometry procedures or other evaluation of implicit geometry definition data in order to determine an extent of final geometry;

FIG. 14 depicts a process of intersection testing within bounding elements that overlap in 3-D space;

FIG. 15 depicts a trapping element setup and transformation process;

DETAILED DESCRIPTION

Displaced geometry can be implemented using vector displacements. Vector displacement allows an arbitrary vector or vector to control displacement of an element of scene geometry or a portion thereof. In some implementations, vector displacement allows a completely arbitrary displacement for any element of geometry. For example, an element of geometry could be displaced in any direction by any amount. Vector displacement thus provides a high degree of control over displacement, but presents a comparatively difficult rendering task.

In some aspects herein, displacement is implicitly constrained within a bound, which is set based on one or more pre-defined vectors, where a maximum displacement can be set for these vectors. In one example approach, artist-supplied vectors can be associated with vertices that define source geometry. An artist can be any human, machine, or process that generates the vectors. The term is used to distinguish these vectors from other vectors that may be associated with source geometry, such as normals that can be associated with vertices and primitives of source geometry. Displacement can be further constrained, for any point on a 2-D surface, to be along a vector determined by interpolating two or more artist-supplied vectors associated with the 2-D surface. Thus, a completely general displacement can be constrained to an analytical result determined by an interpolated vector and a maximum displacement limit.

In order to determine displaced geometry based on a given element of source geometry, the artist-supplied vectors for two or more vertices that define the element of source geometry can be used to control how, or otherwise be used in defining limitations on possible displacements for a particular location on the element of source geometry. The source geometry can be displaced according to some process and according to the determined control vector. The displaced geometry can then be used in ray intersection testing, and for other purposes as appropriate.

Some aspects of the disclosure relate to exemplary systems and processes by which source geometry can be displaced and techniques that can be used in testing displaced geometry for intersection.

Figure 1:
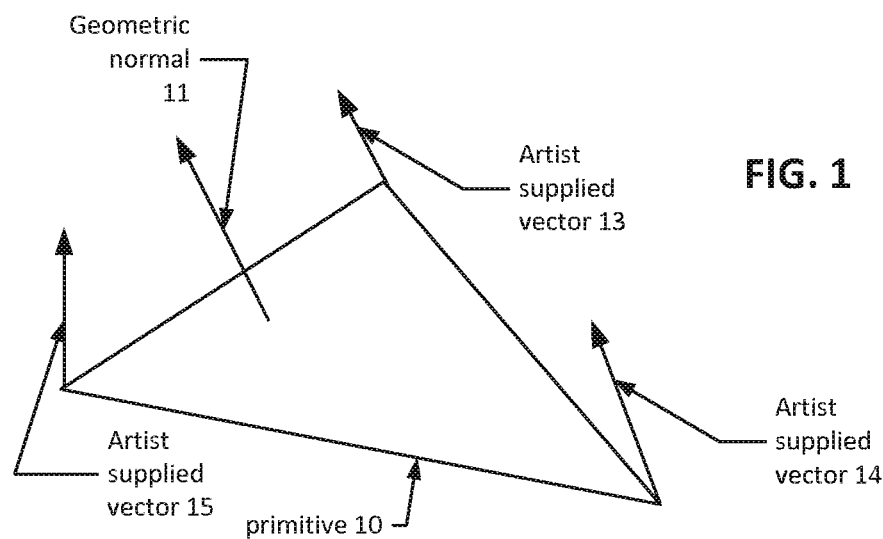
FIG. 1 depicts an example of an explicitly-defined element of geometry that is associated with artist-supplied vectors that are used in approaches to testing rays for intersection with implicitly defined surfaces.

FIG. 1 depicts a triangular primitive 10 that is associated with a geometric normal (which can in turn be defined by a winding order of vertexes forming the primitive and locations of those vertexes in space (the locations of the vertices establish a plane having a normal direction, and a convention establishes which way the normal points along that normal direction). In FIG. 1, the vertexes forming primitive 10 also are associated with artist-supplied vectors 13-15. Here, artist-supplied refers to the concept that these vectors are not needed to define the surface or location of the primitive 10 or its relationship to other primitives, such as a mesh of primitives. Rather, these vectors are used according to the techniques described below.

Figure 2:
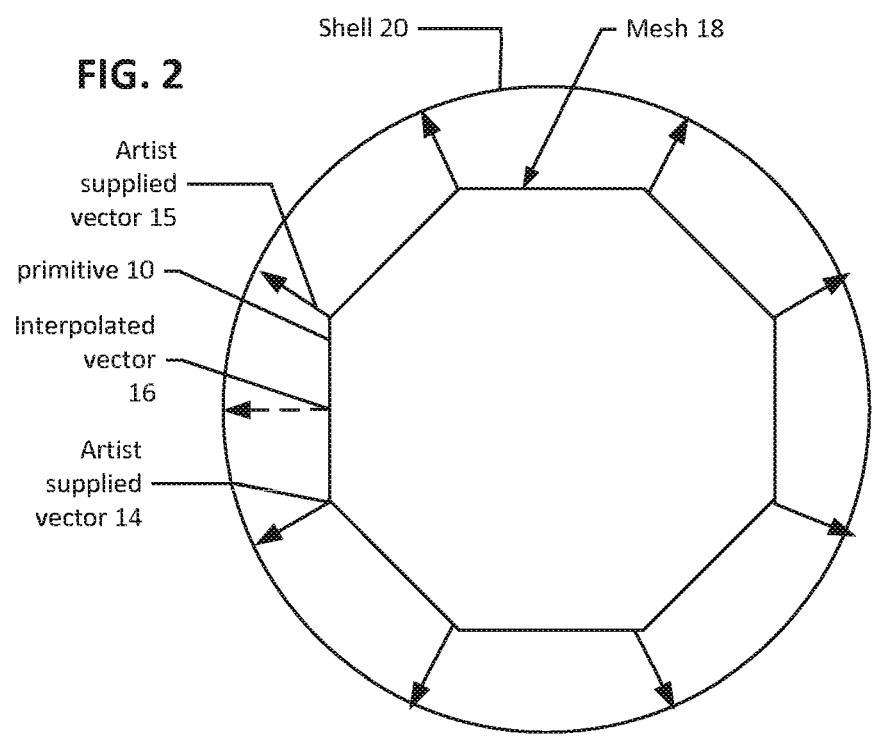
FIG. 2 depicts a shell defined based on artist-supplied vectors according to FIG. 1.

FIG. 2 depicts a mesh of primitives 18 (e.g., looking at a cross-section of a mesh of primitives coarsely defining a sphere.) Primitive 10 is identified, along with artist-supplied vectors 14 and 15. An interpolated vector 16 is shown between these artist-supplied vectors 14 and 15. Collectively, the artist-supplied vectors for the primitives forming the sphere are used to define a shell 20. Shell 20 is depicted as a smooth shape; however, shell 20 would be faceted to a degree determinable by whether and how much each of the original primitives were sub-divided. In one example, the primitives are not sub-divided, and shell 20 would have a facet for each original primitive. In other examples, each primitive would have a corresponding plurality of facets in shell 20. Shells according to the example shell 20 can be used in furtherance of ray tracing implicitly defined geometry, according to the disclosures that follow. Displaced geometry provides an example of implicit geometry processing according to the disclosure. Here, implicit geometry includes approaches to storing a set of geometry data prior to "run time" that is used in some fashion to produce a final geometry surface. In one example, a function can be associated with primitive 10, and that function can be evaluated based on one or more inputs produced during runtime, in order to evaluate presence of final geometry within a particular volume or at a point in 3-D space.

Figure 3:
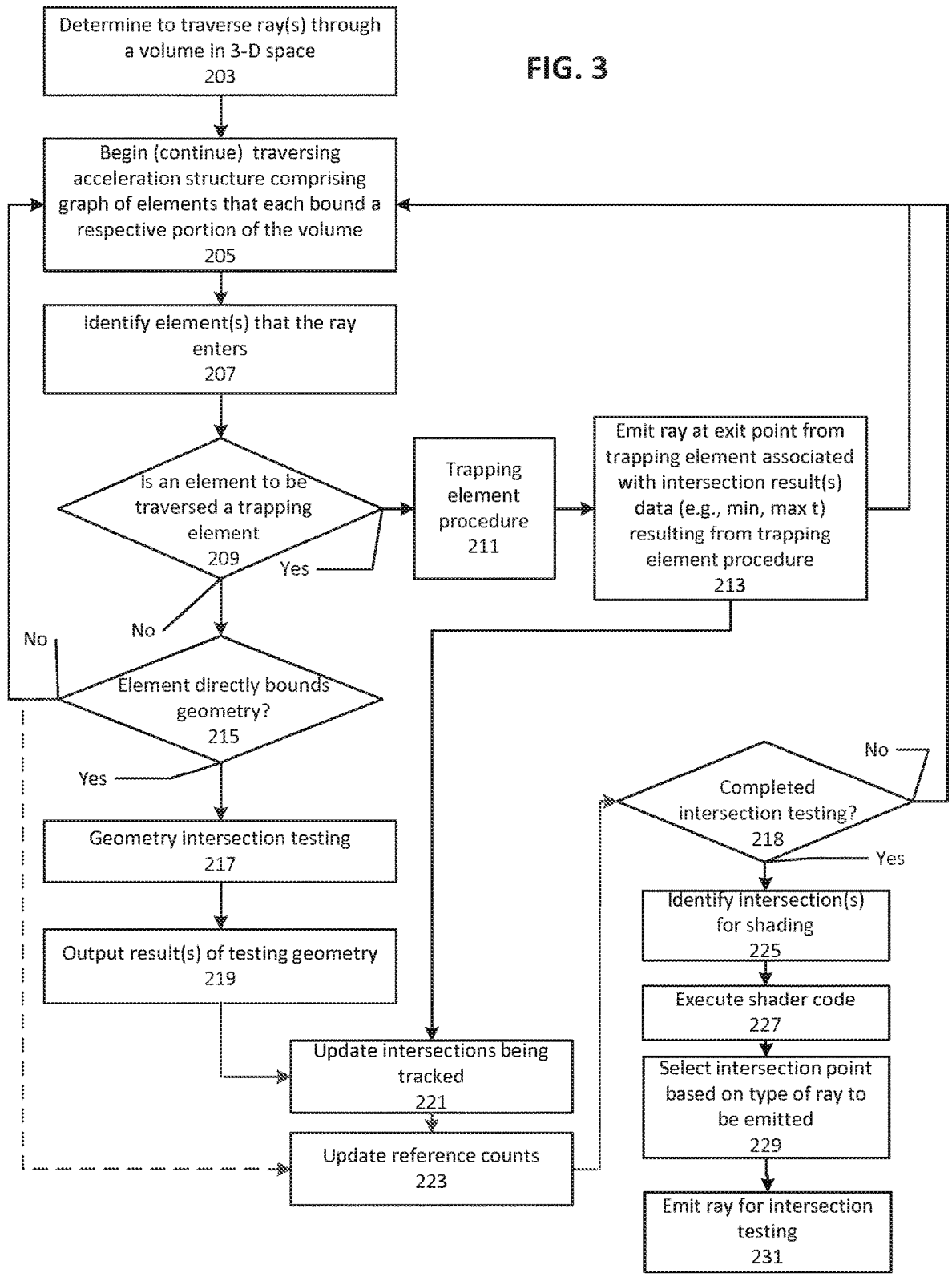
FIG. 3 depicts an example process of traversing rays through a 3-D scene that is defined using explicit geometry and implicit geometry.

An overview of how rays can be traced in a 3-D scene that has explicitly-defined and implicitly-defined geometry is depicted by FIG. 3. At 203, it is determined to trace ray(s) through a volume in 3-D space. Such a volume can be an entirety of a 3-D scene, or a portion thereof. Such determination may be implemented by emitting a ray during rendering of an image, for example. At 205, such ray(s) begin (or continue) to traverse an acceleration structure. The acceleration structure includes a graph of elements that each bound a respective portion of the 3-D scene. Traversal of the graph allows identification of a final subset of geometry against which the ray(s) will be tested for intersection. In some implementations, such traversal occurs out of an order that the ray travels in the scene. As examples, each ray may be tested breadth-first, rays may be grouped and regrouped for testing according to a criteria, and traversal for rays emitted together may not begin together. Thus, a given ray may have candidate intersections identified out of distance order, and such intersection(s) should be further processed in order to ultimately identify a closest intersection for the ray, in typical usage.

Figure 5:
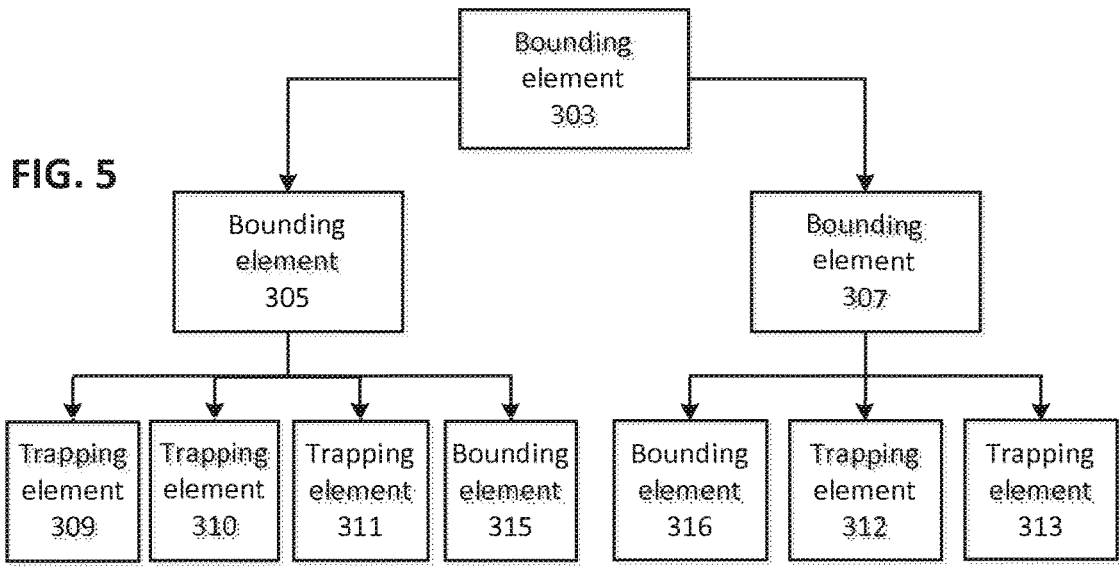
FIG. 5 depicts an acceleration structure with bounding elements and trapping elements.

At 207, the traversal results in identification of elements(s) that the ray enters, and hence need to be further processed to determine whether an intersection for each such ray exists there. At 209, it is determined whether that element is a trapping element or not. A trapping element can be the same shape as other acceleration structure elements, but may be associated with a flag that indicates its status as a trapping element. FIG. 5 depicts an acceleration structure that has both non-trapping elements (e.g., bounding elements 303, 305, 307, 315 and 316), and trapping box elements 309-313. Each of these elements is shown to have a connection with at least one other element, and would be located in 3-D space. Some implementations may have a single trapping element type; other implementations may have a plurality of trapping element types. Such implementations may have multiple bits allocated to indicate the trapping element type. In some examples, indicating that the element is a trapping element results in execution of a trapping element procedure 211. Where an implementation includes multiple trapping element types, a different trapping element procedure may be executed for each type. Trapping elements also may be stored in a separate acceleration structure, which can be traversed separately from/ additionally to one bounding explicitly defined geometry. Here, trapping element types refers to what procedure or differentiated computation protocol will be followed when entering that trapping element. For example, trapping elements can be provided to evaluate a Non-Uniform Rational B-Spline (NURBS) surface or a subdivision surface, determining Level Of Detail (LOD), performing motion blur calculations, and so on. As will be explained further below, an acceleration structure may contain elements for different purposes. For example, trapping elements 309-311 may enclose representations of different levels of detail for the same geometry. Some aspects of the disclosure provide tester circuitry that can selectively traverse an acceleration structure (such as without intervention of a generally programmable computation unit or program that emitted the ray being traversed), as explained below.

If the element is not a trapping element, then at 215, it is determined whether the element directly bounds geometry (e.g., it is a leaf node in a homogeneous acceleration structure). If not, then at 205, traversal continues to subsequent elements (e.g., child elements of the previously-identified element). Reference counts are updated (223), as explained below. If there was directly-bounded geometry, then at 217, that geometry is tested for intersection with the ray(s), and at 219, results of such testing are outputted. Results of intersection testing can include an identifier for a primitive intersected by each ray(s), a distance to the intersection, parametric coordinates determined for an intersected surface, some combination thereof, or other data and combinations thereof In using trapping elements, fully completing the traversal of a ray may involve creating multiple distinct ray segments, each defined with a respective distinct ray data structure. A reference counts can be maintained within each trapping element and also across all of the ray segments used to fully trace a given ray (e.g., rays that may have different origins and/or termini along the path of the ray). For example, a trapping element may have a separate acceleration structure from a principal acceleration structure of a 3-D scene, the ray segment may be located in several elements in that acceleration structure; after resolving the reference count for that trapping element, the ray segment may be completed, but the entire ray, of which the ray segment is a part may not be.

Since other intersections for each ray may have been identified already, at 221, an intersection or intersections being tracked for each ray may be updated. For example, if an intersection closer than a previously-identified closest intersection was identified, then the new closest intersection is maintained in favor of the previous one. At 223, one or more reference counts for each of the rays are updated according to the traversal. In particular, a count may be maintained for each ray, which tracks how many acceleration structure elements that ray currently exists in (where multiple segments are used for one ray, then distributed reference counts may be maintained and ultimately resolved). For example, the count is decremented when testing of a ray with an element completes, but is incremented if that ray is then indicated for testing against a child element. The count reaching zero indicates that the ray has completed traversal (although, depending on implementation, testing of that ray with all geometry may not yet have completed).

Returning to 209 and 211, a trapping element can be used to indicate that there is implicitly defined geometry within the 3-D volume bounded by that trapping element. Processes and system aspects are disclosed with respect to figures following FIG. 3. With respect to the remainder of FIG. 3, an output of a trapping element procedure may include an indication of a nearest intersection of a ray with geometry (implicit or explicit); where a closest intersection is desired, this defines a maximum distance that the ray needs to be traced. The ray also may be associated with minimum distance information, which may be used to exclude acceleration structure elements or geometry, as explained below. These intersections ultimately may feed into process portion 213. At 218, if intersection testing is completed, then at 225, intersection(s) can be identified for shading, and at 227, shader code can be executed. In some implementations, more than one intersection value may be provided for a single intersection, and at 229, one of these values may be selected for use as an origin for a child ray emission occurring at 231. For example, a different intersection value may be selected for a reflection ray than for a refraction ray, as explained below.

Figure 4:
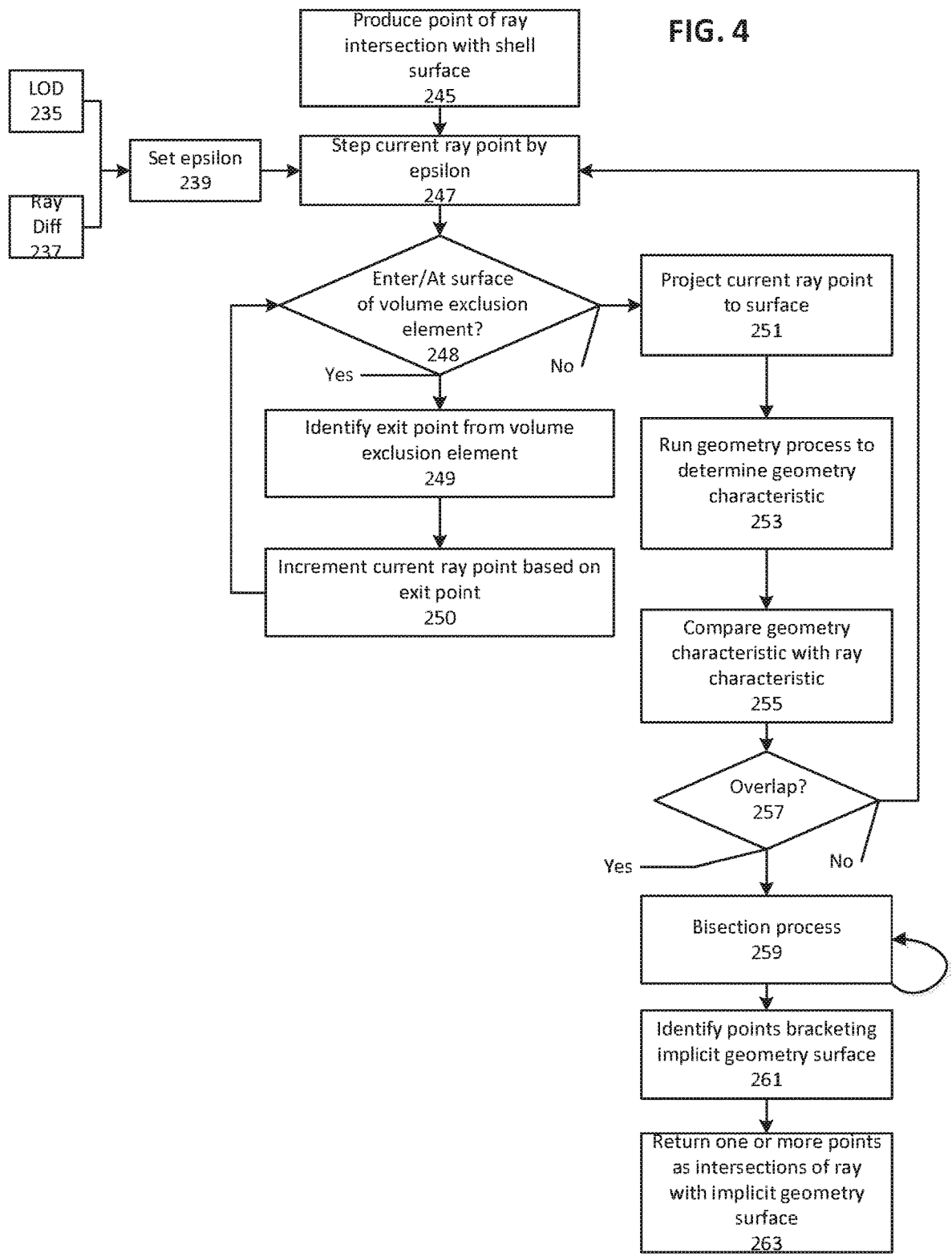
FIG. 4 depicts an example approach to traversing a ray through a 3-D volume that may contain implicitly-defined geometry.

FIG. 4 depicts a first example of a process for identifying an intersection between a ray and implicit geometry. In one example, the trapping element found to be intersected bounds a shell (and source geometry for the shell) as disclosed with respect to FIGS. 1-2. At 245, a point of intersection between each ray(s) and a shell surface is found. Thus, after determining that the ray(s) are to enter the trapping element, the rays can be projected to a surface of the shell at one or more points.

Figure 6:
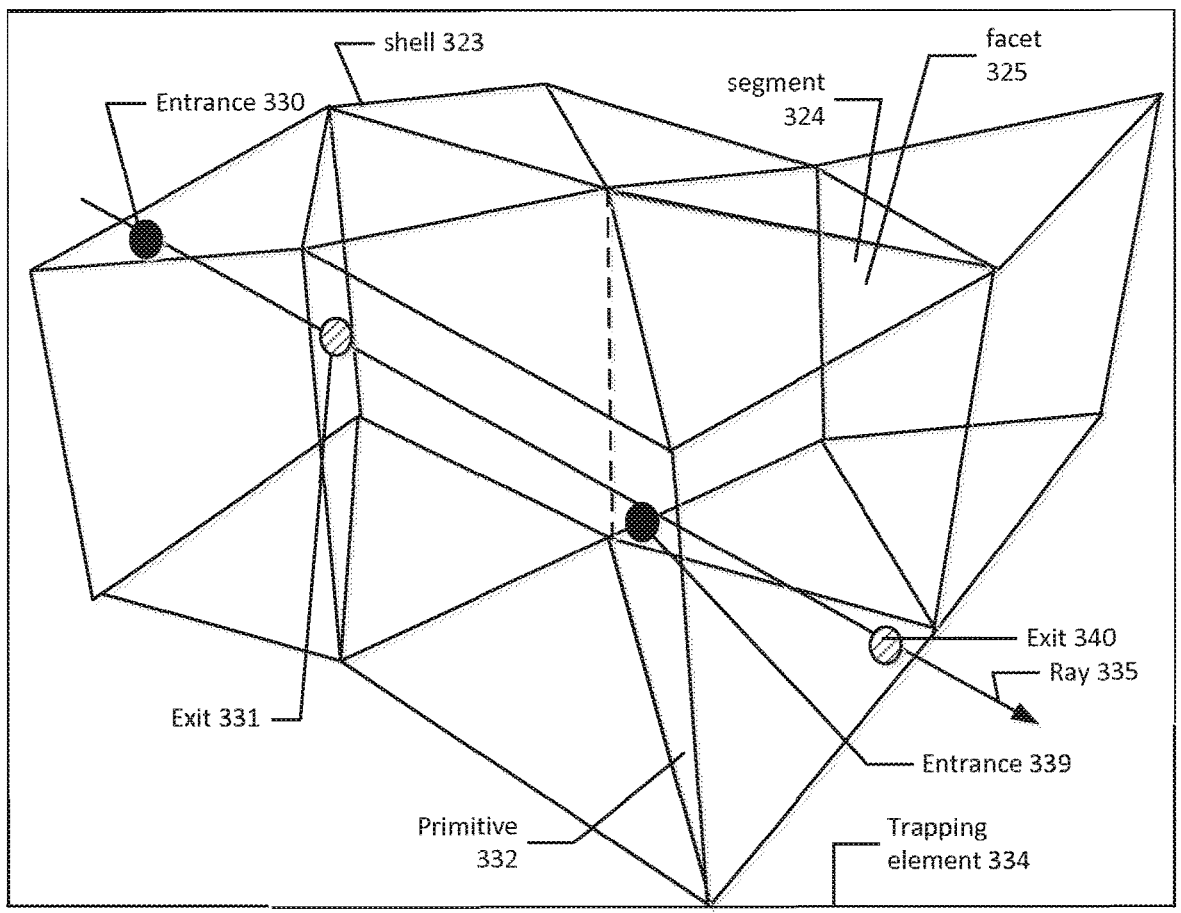
FIG. 6 depicts an example shell bounded by a trapping element.

FIG. 6 depicts a trapping element 534 that bounds a faceted shell 323. The faceted shell 323 can be formed by extruding a set of primitives along directions defined by artist-supplied vectors (FIGS. 1-2). For example, primitive 332 can be extruded to define a segment 324 of shell 323. Thus, in one approach, there is a 1:1 correspondence between facets of a shell and original primitives of the source geometry. FIG. 7A depicts segment 324 as being constructed of primitive 332 of source geometry, and a set of bilinear patches that connect primitive 332 to facet 325. For example, as shown in FIG. 7B, bi-linear patch 350 connects vertex 355 and 356 of primitive 332 respectively to vertexes 358 and 359 of facet 325. Using a bi-linear patch to define sides of each segment allows the segments to be adaptable to a range of problems, by allowing the sides of these segments to be non-parallel to each other. FIG. 8 depicts an alternate construction for a segment of a shell. In the example of FIG. 8, a set of bounding shapes 365-367 (e.g., tetrahedrons) are provided that collectively define the segment.

FIG. 6 also depicts that an entrance 330 to one segment of shell 323 can be tracked, which corresponds with exit point 331. Segment 324 has entrance point 339 and exit point 340. In some situations, the ray may enter the shell but not leave the shell, in that it would first intersect a source geometry primitive. Any of these entrance points, including the first one to the shell, and each segment entered can be considered an entrance point or intersection with a shell surface. With respect to entrance points to each segment of a shell, tracking when a ray enters a different segment of the shell allows a specific geometry process to be associated with each primitive, and executed to evaluate the implicit geometry in that segment of the shell.

Returning to FIG. 4, the rays are then to be stepped through a volume enclosed by the shell to establish a current 3-D position for each ray. The stepping is on an interval (epsilon). At 239, epsilon can be set. As an example, epsilon can be set according to a variety of inputs, such as a level of detail indicator 235 or a ray differential 237. Epsilon can be fixed or variable; FIG. 4 includes description of a variable epsilon implementation. For the remainder of FIG. 4, a single ray is described, although multiple rays can be processed concurrently. At 247, the ray is stepped. At 248, it is determined whether the ray is at a surface of a volume exclusion element within the shell. A volume exclusion element defines a sub-portion of space within the shell in which no implicit geometry will exist. Further description of volume exclusion elements is provided with respect to FIGS. 10 and 11. In brief, volume exclusion elements can be identified by determining a final extent of implicit geometry within the shell, and then defining a set of bounding volumes that enclose regions of space that have no geometry. These bounding volumes can vary in size, in order to fit within different portions of the final extent of the implicit geometry.

If the ray has entered a volume exclusion element, then, at 249, an exit point from the volume exclusion element is determined, and, at 250, the current 3-D position of the ray is incremented to that exit point, and the determination at 248 is performed again. If the current 3-D position is not in a volume exclusion element, then, at 251, that current 3-D position is projected to the surface of the primitive that was projected to define that portion of the shell. An example of such projection is depicted in FIG. 9. FIG. 9 depicts that ray 335 is stepped a number of times along a direction of travel for the ray (to identify current 3-D positions 405), and corresponding 2-D positions 406 on primitive 332 are identified for each current 3-D position. Each of these 2-D positions can be expressed, for example, as a parametric coordinate pair, or using barycentric coordinates. These 2-D positions can be used as inputs to a procedural geometry shader 410, which executes in order to produce an implicit geometry characteristic (collectively, 415 in FIG. 9) for each of the 2-D positions. As explained with respect to FIG. 3, a step size can be set based on a level of detail indicator for the ray. A ray differential also can be used as an input to set a step size.

Setting a step size is one way to adjusting an amount of computation used during marching of a ray. In one sense, the amount of computation may be adjusted based on how much detail is desired for a given implicit geometry rendering. However, in other situations, a total amount of computation may be reduced by finding an intersection region between a larger step size, and then refining the intersection. In some implementations, a region of 3-D positions may be snapped to the same 2-D position, based on a level of detail or ray differential. For example, even if a step size is set to one size, several steps of a ray may snap to be evaluated based on the same function. In another example, a larger step may be taken, and then one or more intermediate step can be interpolated from the ends of that step. For example, where a level of detail is low, then a larger step size may be taken, larger regions of the 2-D surface may all evaluate to the same function value, or interpolated values may be taken for intermediate values, or some combination of these options.

In one example, the 2-D positions also can be used as inputs to a function that outputs a height of implicit geometry for that 2-D position. Here, a height can mean a distance along a path; such path may be a line segment. The line segment may be defined by interpolating artist-defined vectors (see FIGS. 1-2). In other examples, the path may be defined by a function or procedure associated with the source primitive, or a portion of it. Where an implementation displaces along a line segment, an intersection can be detected by comparing, a current height of the ray, in 3-D space, above the surface with a height generated by the implicit geometry function evaluated for that 2-D position. In one example, such comparison can include a subtraction. When the result of the subtraction changes sign, then, it is concluded that the ray has intersected the implicit geometry somewhere between the previous and current step. These operations are examples of operations depicted in FIG. 4, including at 253, running a geometry process to determine a geometry characteristic for the projected current ray point, and comparison 255. The subtraction implements overlap determination 257. If there is no overlap (e.g., the height of the ray is still greater than the implicit geometry at a given point, then the process returns to 269 to perform another step of the ray. If overlap was detected (e.g., the sign of the subtraction result changed), then at 259, a bisection process can be conducted in order to refine the intersection point further. At 261, a pair of 3-D positions can be identified that describe the interval of the ray which contains the intersection. At 263, these points can be returned as representing the intersection of the ray with implicit geometry. It remains to be determined whether this intersection is a closest intersection, since geometry closer than the intersected implicit geometry may remain to be tested.

Instead of comparing heights, a collision detection algorithm can be employed that compares a current 3-D position with the implicit geometry. The current 3-D position can be modeled as a sphere or shape with a certain extent. This extent can be controlled by level of distance information, a ray differential, or some combination thereof. In some applications, the implicit geometry being tested for intersection may originate from a volumetric data set. For example, the volumetric data set can be expressed as data in a uniform or hierarchical voxel structure. For example, data may originate from 3-D scanning technologies, such as medical imaging scanners, such as Computed Tomography (CT) scanners, and similar technologies.

FIG. 10 depicts a curve 430 that represents a final surface of implicitly-defined geometry (shown in 2-D for clarity). Bounding element 429 encloses this geometry (shell and a trapping element, if provided). With respect to a trapping element, a size and overall dimensionality of the trapping element may be influenced by constraints on the form of the trapping element (e.g., an axis aligned box, a square, a sphere, and so on). Such constraints may affect a tightness of fit capable of being achieved for a given shell. FIG. 11 depicts exclusion elements (431 and 432 specifically identified) that fill space between final geometry 430 and bounding 429. These exclusion elements also may be sized and positioned according to constraints placed on the shapes that can be used for the elements. Further constraints may relate to an amount of memory to devote to these elements. For example, a minimum size of element may be required, or a maximum size of memory required for storing data defining the exclusion elements in a particular trapping element may be set. These decisions can be made based on characteristics of a computing platform that will implement the stepping algorithm, including memory bandwidth and size characteristics, power consumption constraints, requirements on latency, throughput, and so on. FIG. 13 depicts an example process by which volume exclusion elements can be produced. At 451, a portion of implicit geometry is identified (e.g., procedurally defined displacement). Such identification can occur in a pre-execution environment, in which source geometry is submitted, along with a function(s), procedure(s), or other definition of how the implicit geometry will be determined when necessary (e.g., for testing for intersection). At 455, these function(s), procedure(s), and so on are evaluated or executed as appropriate in order to obtain a final geometry extent. In some cases, such final geometry extent will depend on information available only during runtime, or more generally, information that is not yet available (e.g., the evaluation depends on a value retrieved during a lookup operation). In such circumstances, the source geometry, function, or procedure can be associated with information on a range of values that can be expected from the lookup. In other implementations, an expression that describes a value to be returned from the lookup can be supplied, and a final extent of implicit geometry can be evaluated based on a joint evaluation of these sources.

At 457, based on this evaluation, exclusion volumes are defined within a maximum extent of the final geometry and within a shell (see FIG. 6). Examples of implementations of exclusion volumes include voxel structures, which can be hierarchical, such as an oct-tree. In an alternate implementation, the shell may be omitted, and then exclusion volumes would be defined based on an extent of the trapping element that will bound the final geometry. If the shell were omitted, it would generally be expected that a larger quantity of volume exclusion elements would be required, since trapping element would not bound the final geometry as closely as the shell. At 459, definitions of these exclusion volumes are stored for later access. In addition to defining exclusion volumes in a pre-pass, volume portions can be excluded based on properties of a function describing an implicit geometry surface.

FIG. 12 depicts more details concerning how trapping elements can be used for intersection testing of implicit geometry and more generally, for abstracting portions of 3-D space. As an additional example usage, trapping elements can be used to abstract instances of the same geometric object, even if they do not use implicit geometry. FIG. 12 gives a toy example of a tree being a geometric object, with instances 405-407 of this geometric object being bounded by respective trapping elements 431-433. These trapping elements can in turn be bounded by a bounding volume 420 (see FIG. 5). Instance 431 is shown as overlapping with instance 432. Such overlap, in a 3-D scene, could be a situation where branches of these tree instances intertwine, such that they occupy overlapping volumes of space. A ray 438 is being traversed in the scene. FIG. 3 depicted a process that uses a trapping element procedure 211; FIG. 15 depicts an example of trapping element procedure 211.

In FIG. 15, when a ray encounters a trapping element, in order to test that ray for intersection with geometry in the trapping element, that ray is transformed at 461 to a coordinate system referenced by the trapping element. At 463, one or more process(es) are performed. These processes can vary significantly based on the characteristics of the trapping element. For example, an implicit geometry process may be performed. Or, geometry bounded in the trapping element may be tested. Ultimately, at 465, resulting data is produced. As an example, this resulting data is a closest intersection found, based on the geometry tested or the processes performed. A variety of data can be produced as a result of intersection testing in a trapping element, including barycentric coordinates, a distance to the intersection, a point in 3-D space identifying an intersection point, or another expression of a location of the intersection.

Where this data contains positional information, it can be expressed in the coordinate system referenced by the trapping element. At 467, the positional information and associated information is transformed from the referenced coordinate system to a global coordinate system (or another coordinate that is common to other operations to be performed). Such transformation could be performed immediately, but in another implementation, a transformation matrix may be provided that will allow the transformation to be effected at a later time. For example, a result data structure may contain the result data in the referenced coordinate system and a transformation matrix. Later, during an intersection disambiguation or sorting process, the transformation matrix can be applied to the result data. This implementation may be appropriate where the functional unit performing the intersection testing may not have a capability to perform a matrix transformation, or may not perform such transformation efficiently. If a trapping element does not reference a coordinate system other than the global coordinate system, then a transformation matrix may not be required.

Returning to FIG. 12, in this figure, the ray originates within both trapping element 434 and trapping element 435. In some systems according to the disclosure, it could be a case that trapping element 435 (and/or geometry in 435) is found to be intersected by ray 438 before it is determined that ray 438 also intersects trapping element 434 (and/or geometry in 434) (e.g., if each ray begins testing at a root of a hierarchical acceleration structure, then ray 438 may visit trapping element 435 first). This situation could occur because of deferral of some intersection tests or deferred propagation of intermediate results of testing, or simply based on how the testing happened to be scheduled, for example. Thus, instance 432 may be evaluated for intersection before instance 431, even though portions of instance 431 are closer to the origin of ray 438. FIG. 14 depicts an example approach to intersection testing that accounts for these situations.

FIG. 14 depicts that results for intersection testing with implicit geometry are produced at 411, and results of testing the same ray with explicit geometry are produced at 413. In the process of FIG. 14, there are multiple intersection results available for a given ray. More commonly, it might be expected that a single closest intersection for a ray is maintained, and each time an intersection result for that ray is identified, it is compared with that closest intersection, and the single closest one is maintained. Here, however, a simple distance evaluation may be insufficient to immediately disambiguate which intersection is closest, or in other situations, there may be two intersections that have distances indistinguishable from one another, at a resolution at which the results are expressed (e.g. single precision floating point). In these situations, an approach that provides reproducible results may be important, even though there is more than one "valid" solution. In the case of an acceleration structure element (trapping or regular), if any part of the volume of that element overlaps a range defined by a minimum distance and the current closest intersection, then that acceleration element would not be excluded from being entered for testing (acceleration structure elements do not establish a closest intersection for a ray (i.e., a maximum t)).

FIG. 14 depicts that, at 415, a determination whether any two or more of multiple intersection results are at undifferentiated distances. There may be some geometry intersections evaluated that are clearly not the closest one, under the circumstances present. These can be excluded; if they are excluded before the process of FIG. 14, then determination 415 may be omitted for those, but still may be needed to identify or maintain overlapping acceleration structure elements for test. If all geometry intersection results are at different intersection distances, then a closest intersection (or group of) can be used (here, a group of intersections can be, for example, a pair of points returned as bracketing an intersection of a ray with a surface, such as a result returned from a ray march as discussed with respect to FIG. 9).

At 419, an ID for each object (e.g., acceleration structure element or primitive) having undifferentiated distance compared with comparison objects is accessed. Based on the IDs of the objects, one or more objects may be excluded from further processing, or selected. At 423, intersection information for the ray is updated based on 421. At 425, reference counts for the ray are updated. A reference count for the ray is increased when it is added for test against an acceleration structure element, and decreased when removed or when an element is excluded from test, if previously indicated for test.

Considering 421 in more detail, an acceleration structure element may be excluded from further processing if its identifier indicates that it already has been entered for testing. This may be determined by comparing at least a portion of the identifier for the acceleration structure element with identifier information stored or associated with the ray. Such information stored with the ray may include an identifier of the acceleration structure element that has a highest value in a sequence of identifiers (e.g., all the identifiers have a relative order, and the ray maintains identification of a highest order element) that was already entered for that ray. A specific example can be considered with respect to ray 440. Ray 440 can be seen to first enter trapping element 434. A minimum t would be established for that trapping element upon entering the trapping element. Ray 440 also intersects trapping element 435, but the distance to that intersection is different from the intersection with trapping element 434. However, it also is the case that the intersection with trapping element 435 remains within a volume of trapping element 434. Thus, in this circumstance, trapping element 434 may be reentered and processed. So in one approach, the minimum t can be used to exclude, from retesting, geometry bounded by bounding elements that do not overlap with another element.

Instances of the same geometry can be spread through a 3-D scene, with each instance being enclosed by a difference trapping element. Each trapping element includes a world space coordinate location (and/or extent). Each trapping element can be a different size and can be oriented differently. For example, trapping elements can be scaled and rotated. Each instance space can use a referenced coordinate system. Each trapping element also can include information about a transform to be applied to a ray in order to translate between world space and the referenced coordinate system of that instance. Each trapping element also can include a reference to objects or other data within that trapping element, for example, explicit geometry and other data, as explained above. In another example, each element of an acceleration structure can have an identifier, and acceleration structure elements that represent a trapping element encapsulating the same geometry can have a certain number of bits in common. Rays that intersect these different instance elements can be collected, and can begin intersection testing together. Where each trapping element has a reference to instance space, then that reference can be used to collect rays that will need to test that referenced instance space. Where a portion of an identifier is shared among elements that reference the same instance space, that portion of the identifier can be used to collect rays.

Figure 16:
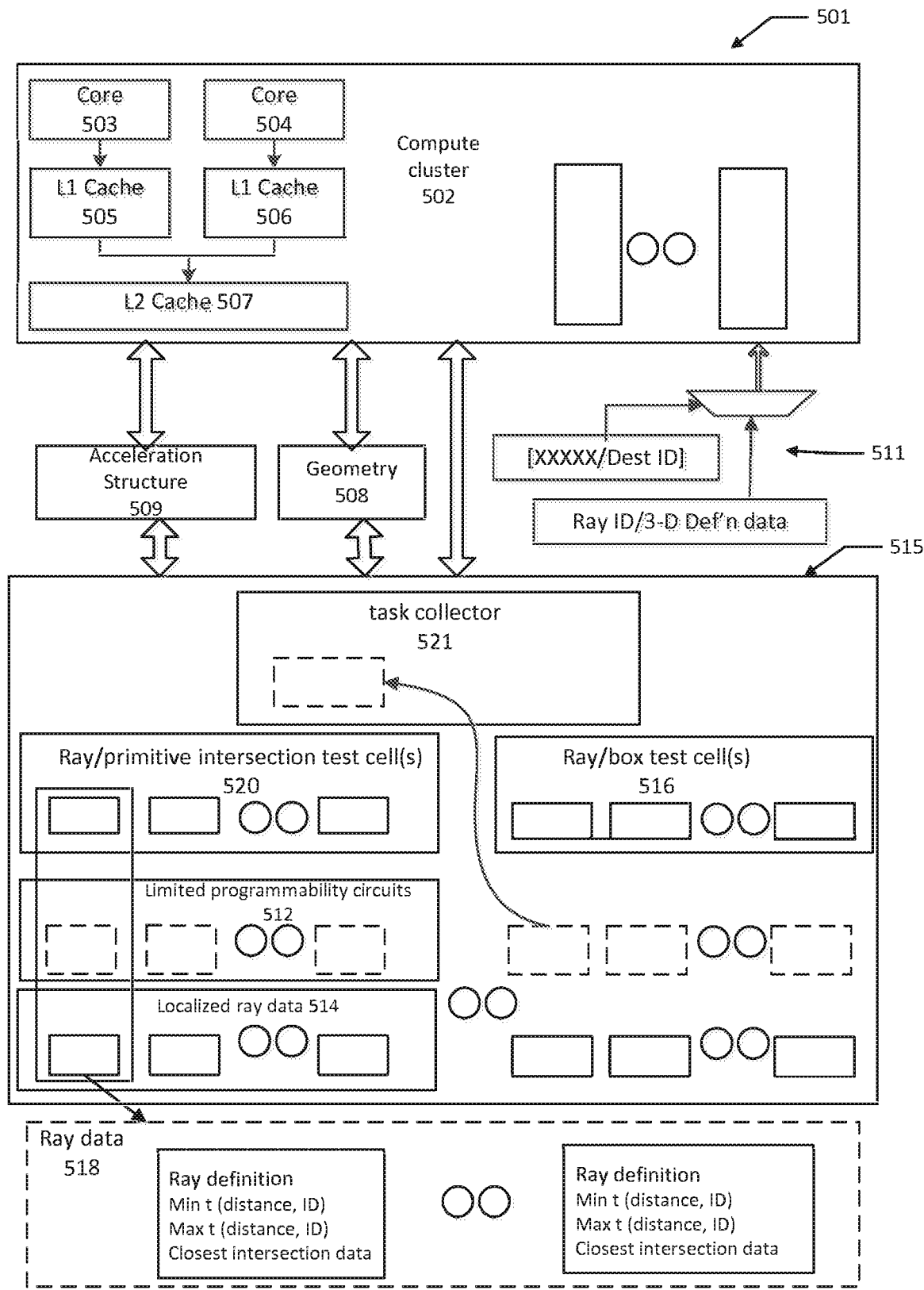
FIG. 16 depicts an example system in which disclosed aspects can be implemented.

FIG. 16 depicts a system 501 that can implement aspects disclosed herein. System 501 comprises a compute cluster 502 that can have a set of cores, each capable of executing instructions from a respective independent instruction stream. Each core can have a private cache and can share a secondary cache with one or more other cores; other cache configurations can be implemented. For example, cores 503 and 504 can each have a private L1 cache, 505 and 506 respectively. Cores 503 and 504 can share L2 cache 507. Compute cluster 502 can read from acceleration structure storage 509 and from geometry storage 508. Compute cluster 502 can be assisted with performance of various algorithms, such as rendering algorithms by throughput compute unit 515. Compute unit 515 comprises a task collector 521, a plurality of ray/primitive intersection test cells 520 and a plurality of ray/box test cells 516. Each of these cells can be configured to execute one or more defined intersection algorithms. Ray/box test cells 516 can be implemented so that they produce a distance from a ray origin to an intersection point with a box, when the ray originates from outside of the box. Ray/box test cells 516 also can be implemented so that they return a distance that the ray travels to a point of exit of a box, when the ray originates in the box (e.g., ray 438 originates in trapping element 435, and ray/box test cells 516 can be made to return a distance to exit trapping element 435.) Ray/box test cells are an example of test cells for a particular kind of shape. Test cells can be provided for other kinds of shapes, either in addition to or in substitution of box test cells.

In some examples, each test cell comprises fixed-function circuitry that performs at least a portion of a given intersection algorithm. Example primitive tests include tests for intersection with triangular primitives, such as the barycentric coordinates test. Boxes tested for intersection may be axis-aligned bounding boxes, for example. Other approaches to acceleration structure tests include kd-tree testing. In addition to these intersection testing cells, compute unit 515 may comprise a set of (one or more) limited programmability circuits 512, which can be associated with respective test cells or included in task collector 521.

Each intersection test cell may use a respective local ray data storage 514. As a particular example, ray data 518 comprises sets of ray definition data. Each set of ray definition data may comprise a minimum distance identification (min t). In an example, the minimum distance can be used to step through a set of elements, without having to test them all for each step in same process, as explained above. A maximum distance identification (max t), which can identify the closest current intersection for that ray, also can be stored. Data concerning the current closest intersection may be stored, such as interpolated varyings for an intersection point, barycentric coordinates, and a primitive identifier. In general, data stored can be selected based on data that would be needed to execute a shader for the ray (if the intersection to which the data pertains is one to trigger shader execution). Where an intersection involves a bounding box element (e.g., a trapping element) with a referenced coordinate system, a transformation matrix describing a mapping between global and local coordinates can be stored.

As explained above, task collector 521 forms groupings of computation (e.g., groupings of rays that can be tested together). A grouping of rays can identify an acceleration structure element to be tested. In some examples, the acceleration elements can be elements that define a given object (or portion of) at a respective LOD. These elements may bound such different LOD geometry in overlapping space. In one implementation, these elements can be trapping elements. A ray can be associated with an LOD indicator, a ray differential, a spreading factor, or there can another mechanism for deciding a LOD at which geometry is to be represented. A limited programmability circuit can select one or more collections, each associated with a respective acceleration element, in which to place a ray. For example, even though the acceleration structure element tested may have a number of child acceleration structure elements, only a subset of those may be selected by the limited programmability circuit. For example, an acceleration structure element associated with a particular Level of Detail (LOD) may be selected. In some examples, the ray may be in a transition zone between two levels of detail, and the ray may be added to two collections, so that the ray is traversed in geometry at multiple levels of detail. An attenuation of the ray can be adjusted based on what the limited programmability circuit does, such as reducing importance of each of multiple rays that are derived from a single original ray. As another example, a limited programmability circuit can neglect to add a ray to any collection, even if a parent element was intersected. Thus, a limited programmability circuit can influence or control subsequent testing of a ray.

System 501 also may provide a result return path 511. In some cases, a result may require further processing that will be performed by program code distinct from program code that generated the task leading to the result. However, in some cases, the further processing may use some portion of data common to the program code that generated the task. Depending on an architecture of compute cluster 502, and as one specific example, on an efficiency of moving data from one core to another (such as across different L2 caches 507), result return path may be configured to return a result to a core that uses an L2 cache 507 that already stores the data to be used in the further processing. In some implementations, a destination identifier can be associated with a task, when it is generated, and that destination identifier can be used to guide a result back to a source of that task.

Figure 17:
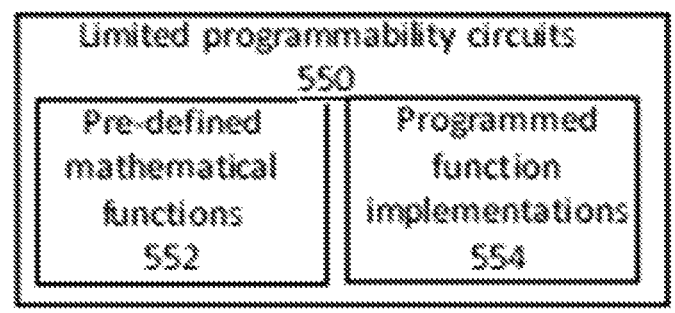
FIG. 17 depicts an example of limited function circuitry that can be included in system implementations according to FIG. 16.

FIG. 17 depicts an example of a limited programmability circuit(s) 550 that can be used to implement the limited programmability circuits 512 depicted in FIG. 16. Circuit(s) 550 may comprise pre-defined mathematical functions 552 and programmable function implementations 554. The pre-defined mathematical functions 552 may include a set of functions that can be evaluated for different values for one or more independent variables for the functions. Such pre-defined mathematical functions may include a matrix transformation for a 3-D space according to a transformation matrix supplied to the limited programmability circuit. In another example, programmable function implementations can execute or repeat a defined operation or set of operations for a number of times.

Examples of how circuitry can be limited-programmability includes that the circuit is capable of executing a limited number of instructions, or is otherwise required to complete in a fixed timeframe, that programs avoid looping or branching, or that the circuit does not have an instruction fetch pipeline. In one example, branching is supported by executing multiple paths through a section of code, and then selecting a result or masking an undesired result. Where the limited programmability circuit does not support instruction fetching, a set of instructions can be pre-loaded through a control path. A limited memory may be provided for storing these instructions, and can be designed to support a maximum latency or timeframe of execution, as explained above. Thus, a limited programmability circuit can work in conjunction with a test cell in order to implement marching, iterations, progressive refinements, bisections, successive approximations, displacements, vector graphics, volumetric effects, and so on.

Figure 18:
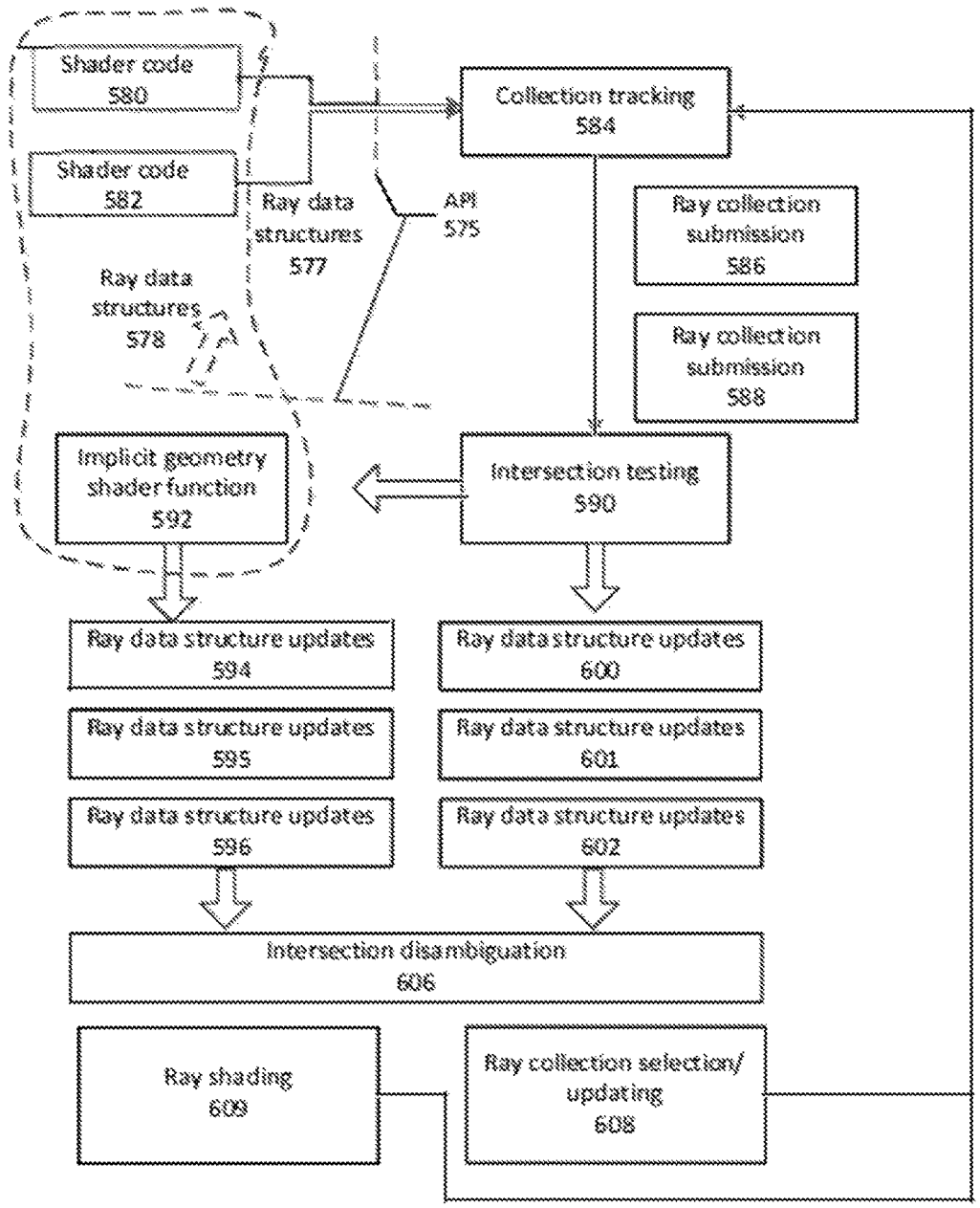
FIG. 18 depicts an example process of intersection disambiguation where concurrent intersection testing of multiple portions of a ray path may be performed.

FIG. 18 depicts an overall flow of ray information in an example implementation. Shader code 580 and shader code 582 each can emit rays; such rays can be defined by data contained in a ray data structure. The data in the ray data structures can be produced by shader code modules, which can submit the data using an API 575. For example, API 575 may have a ray emit call that accepts a set of data for the ray. A collection tracking function 584 can receive data from the ray data structures and collect each new ray to begin traversal with one or more other rays. There may be a variety of intermediate steps or functional elements between emitting a ray and tracking that ray in a collection, and FIG. 18 does not imply a direct linkage.

Ray collections produced by collection tracking function 584 can be emitted or submitted to begin traversal (e.g., collections 586 and 588). These collections can be received for traversal by intersection testing function 590 (which can be implemented by primitive test cells and acceleration structure element test cells, in an example). Intersection testing function 590 can activate an implicit geometry shader function 592, for one or more instances where implicit geometry is to be traversed or tested for intersection.

Intersection testing function 590 and implicit geometry shader function 592 can each produce ray data structure updates, those from geometry shader function 592 being numbered 594-596 and those from intersection testing function 590 being numbered 600-602. Intersection disambiguation function 606 can receive the data structure updates from these sources (or other sources, if present), and produce an output that updates ray collections in which the ray will be tracked (608) during further traversal (seeking a closest intersection) and initiation of ray shading (609) (for an identified closest intersection), which may cause emission of further rays to be traversed. The production of updates to data structures may be an appropriate implementation where the geometry shader function or at least certain portions thereof, are implemented by a limited programmability or fixed-function element coupled with intersection testing 590. In such an implementation, a general purpose portion of code may not be invoked for that geometry shader function or such general purpose portion of code may setup the limited programmability unit, but not perform all of the calculations. FIG. 18 depicts aspects of an alternate implementation in which geometry shader function 692 is implemented by code executed on a general purpose compute element. In such an implementation geometry shader function 592 can be considered a "peer" of shader code 580 and 582, in that geometry shader function 592 can be invoked in response to a ray intersection, as can code 580 and 582, and an output of such geometry shader function 592 can be effected by using a ray emit call of API 575. Thus, geometry shader function 592 can be invoked using the same semantic as used for invoking shaders after a ray completes intersection testing. However, geometry shader function 592 operates during an intermediate phase of intersection testing to produce results for testing a ray with implicit geometry. A result of that testing can be carried with a new ray emitted through API 575. Thus, over the course of traversing a given ray path, multiple different rays may be emitted, and intersections may be accumulated over the path. Some implementations may use the geometry shader function 592 to compare intersections associated with a ray that caused invocation of the shader, and ultimately determine whether a newly-identified intersection is closer or not to the origin of the ray path, and retain the closer intersection only. In other implementations, test cells 520 can compare an intersection stored in localized ray data 514 with an intersection identified in an arriving ray data structure, and keep the closer. In such an implementation, test cells 520 maintain the current candidate for the closest intersection in its localized ray data 514, by comparing intersections that come from geometry shader function 592 and/or from its own testing operations.

Intersection disambiguation function 606 takes a set of intersections for a given ray path, and determines a closest intersection from among that set of intersections. For example, where a given ray path has traversed one or more instances of trapping elements, there may be a local intersection for that trapping element, while there may also be an intersection for the ray with geometry that was not bounded by a trapping element, which was found during concurrent testing of the ray. These intersections may be stored in different data structures, which are collected for comparison purposes. For example, a plurality of separately instantiated rays may ultimately be used to fully trace a single ray path, and those rays may be traced concurrently in the scene. In other implementations, multiple portions of a single ray path may be traced serially, where one ray completes (i.e., a data structure defining a ray that is along the ray path, but possibly only a limited segment of the path), and another is issued and carries information relating to completed portions of intersection testing. Reference counting across these multiple portions of a ray path may also be maintained as each segment completes. The functions disclosed with respect to FIG. 18 may be realized in fixed-function hardware, or in configurable hardware, or in hardware programmed by software.

In further regard to trapping elements, the above-disclosure provided an example relating to displaced geometry. Trapping elements can be provided to handle a variety of situations. For example, motion-blur can be implemented within trapping elements by performing calculations using a time-value associated with the ray to test where the intersection with a moving object occurs at sequence of moments in time. Then, these results can be blended in order to determine a motion-blur feature. Although a trapping element may reference a coordinate system other than a world-space coordinate system, a trapping element may also use world-space coordinates.

Figure 19:
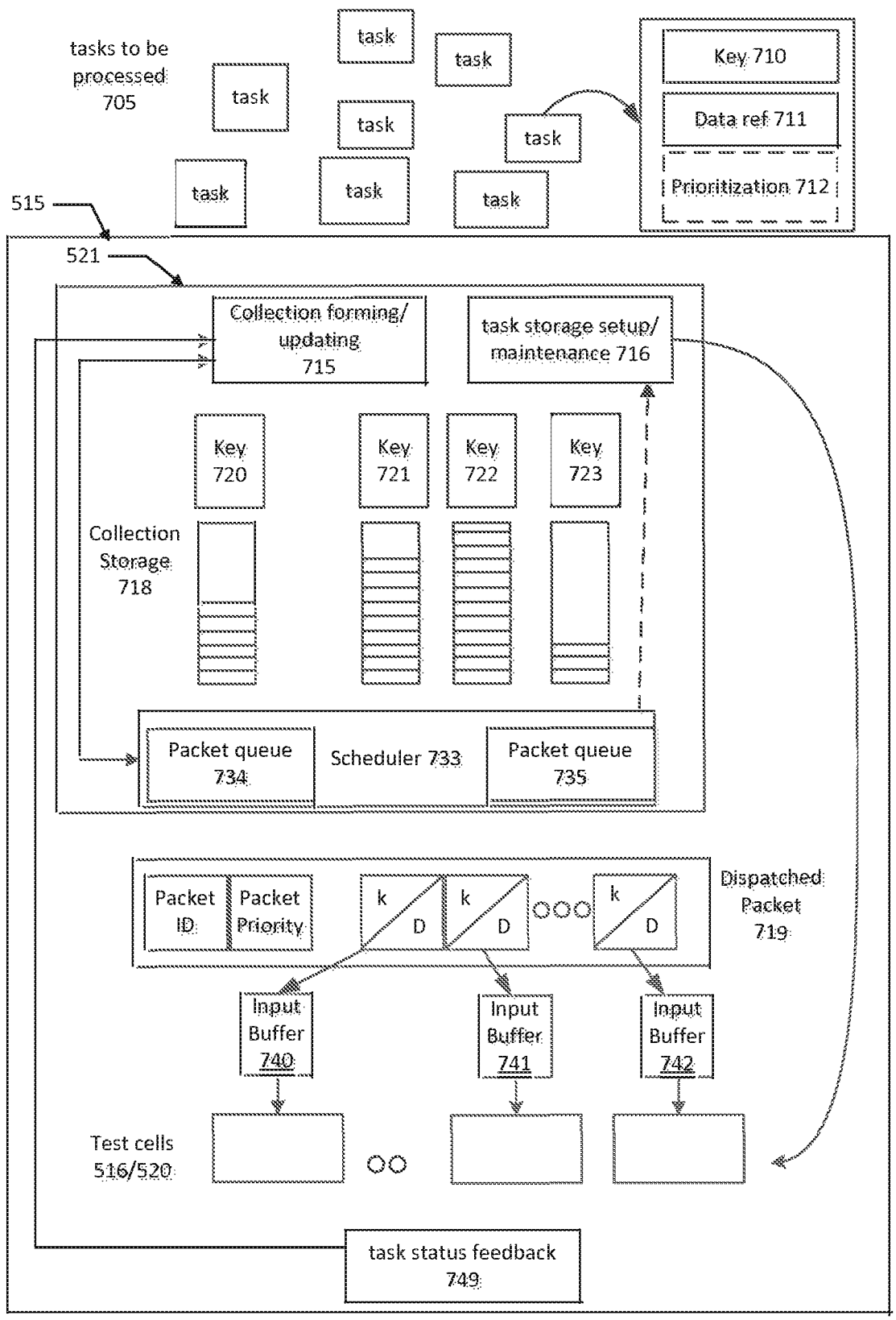
FIG. 19 depicts an example operation of a throughput compute unit.

FIG. 19 depicts an example operation of throughput compute unit 515. Tasks to be processed 705 are inputted to compute unit 515. As an example, each task can include a collection key 710, a data reference 711, and an optional prioritization indicator 712. In some implementations, key 710 identifies an input or part of a computation problem that will be shared among a plurality of computation processes. In some implementations, data reference 711 identifies a portion of data that is to be processed as a data element in a vector of data elements with the input or computation problem identified by key 710. As one example, key 710 can identify an acceleration structure element, and data reference 711 can identify a ray to be tested for intersection with the acceleration structure element. Key 710 can identify a program or process to be performed on or with data referenced by data reference 711. As another example, key 710 can identify a coefficient to be multiplied by data identified by data reference 711. Other data describing tasks 705 can be available in the system, or provided within a datastructure, but not all of this data may be moved around together within throughput compute system 515. For example, each task may be associated with additional data to be used in further processing based on a result of the task, but that additional data is unnecessary for performance of the task itself.

These tasks 705 (or portions of descriptive information for the tasks, such as key 710, data reference 711, and prioritization 712) may be provided to task collector 521 (FIG. 16), which is shown here as containing a collection forming/updating module 715. Module 715 may be implemented with a cache that stores collections of data references 711, in association with a respective key 710. As an example, multiple data references may be stored in association with a single key. FIG. 19 depicts collection storage 718 comprising keys 720-723, each having a bin of data references associated with it, in summary of the above. A priority may be produced for each collection based on prioritization indicators 712 that were associated with each task whose data reference was associated with that collection. As an example, each collection may be given a priority based on the highest priority task in that collection. The same task (e.g., a data reference from that task) may exist in multiple collections. In the context of ray tracing, each collection can be associated with a shape to be tested for intersection with the set of rays collected into a collection associated with that shape. In an implementation, collection storage 718 can include an interleaved cache, where keys (e.g., 720-723) are hashed or masked in order to identify candidate positions at which a collection for that key may be placed. A collision among collections may be resolved by an eviction of a collection.

A scheduler 733 uses the data in collection storage 718 to form packets comprising data from different tasks that were associated with a given key in a collection from collection storage 718. Scheduler 733 can communicate with collection forming/updating module 715 in order to coordinate formation and eviction of collections from collection storage 718. Scheduler 733 may store packets, awaiting emission, to one or more packet queues (two queues 734 and 735 depicted). Where multiple queues are used, packets can be sorted based on a priority of the packet. Queues can be implemented in a non-transitory memory as first-in-first-out memories, linked lists, ring buffers, and so on. Packets from queues 734 and 735 can be dispatched (e.g., dispatched packet 719). Dispatched packet 719 is depicted to include a packet ID, a packet priority, and a set of keys, and associated data references. In one example, packets may include a single key, which identifies a program for execution, a data element to be used during execution, or both.

Prioritization indicator 712 may be implemented in a variety of ways. Indicator 712 can simply be a sequence identifier (e.g., an incrementing number) that indicates a relative order or time at which the task was emitted. In one approach, this sequence identifier allows a minimum quality of service for completion of each task. Tasks also can have respective indicators 712 that are interpretable as a higher or lower priority than a minimum quality of service level. Tasks do not need to have unique indicators 712, even if a general case provides an incrementing identifier. For example, a relatively higher priority for a newly emitted task can be achieved by duplicating a sequence identifier that is closer to a current task clearance number (as explained with respect to FIG. 20), and implementations according to the disclosure can process the newly emitted task at the same priority as a previously-emitted task that has the same sequence identifier. Other implementations may provide a sequence identifier and a separate prioritization field.

Test cells 516/520 (see FIG. 16) receive inputs at respective input buffers 740-742. The inputs can be selected for distribution among test cells 516/520 based on which of the test cells stores localized data for execution related to those inputs. For example, definition data for a ray identified by a specific data reference 711 may be stored in a local memory of only one of the test cells 516/520, and that data reference would be distributed to that test cell, along with a reference to a shape or shape data to be tested with respect to that ray. A task status feedback 749 can be implemented by the limited programmability circuit(s) 550. In an example of traversing a ray through an acceleration structure, the feedback can include selecting which children, from a plurality of children, a ray should be collected against next. That can be effected by providing a task with a key 710 for each child element. More generally, circuit(s) 550 can calculate a reference or address of a program, acceleration structure element, or a data element to be used in subsequent processing or to be processed as a next step for a particular data reference 711.

In one example, modules of code can execute on compute cluster 502 in order to setup relevant data in local memories of test cells 516/520. However, in some implementations, a task storage maintenance module 716 can setup data in those local memories, based on information arriving in task definitions. For example, module 716 can arrange direct memory transfer requests, from a shared coherent memory to local memories of test cells 516/520. These transfers can be scheduled with awareness of which packets have been queued by scheduler 733. Although the exact timing of when a given task is performed by test cells 716/720 may not be deterministic, a small cache can be provided to buffer data retrieved from a shared memory until used and then discarded.

Figure 20:
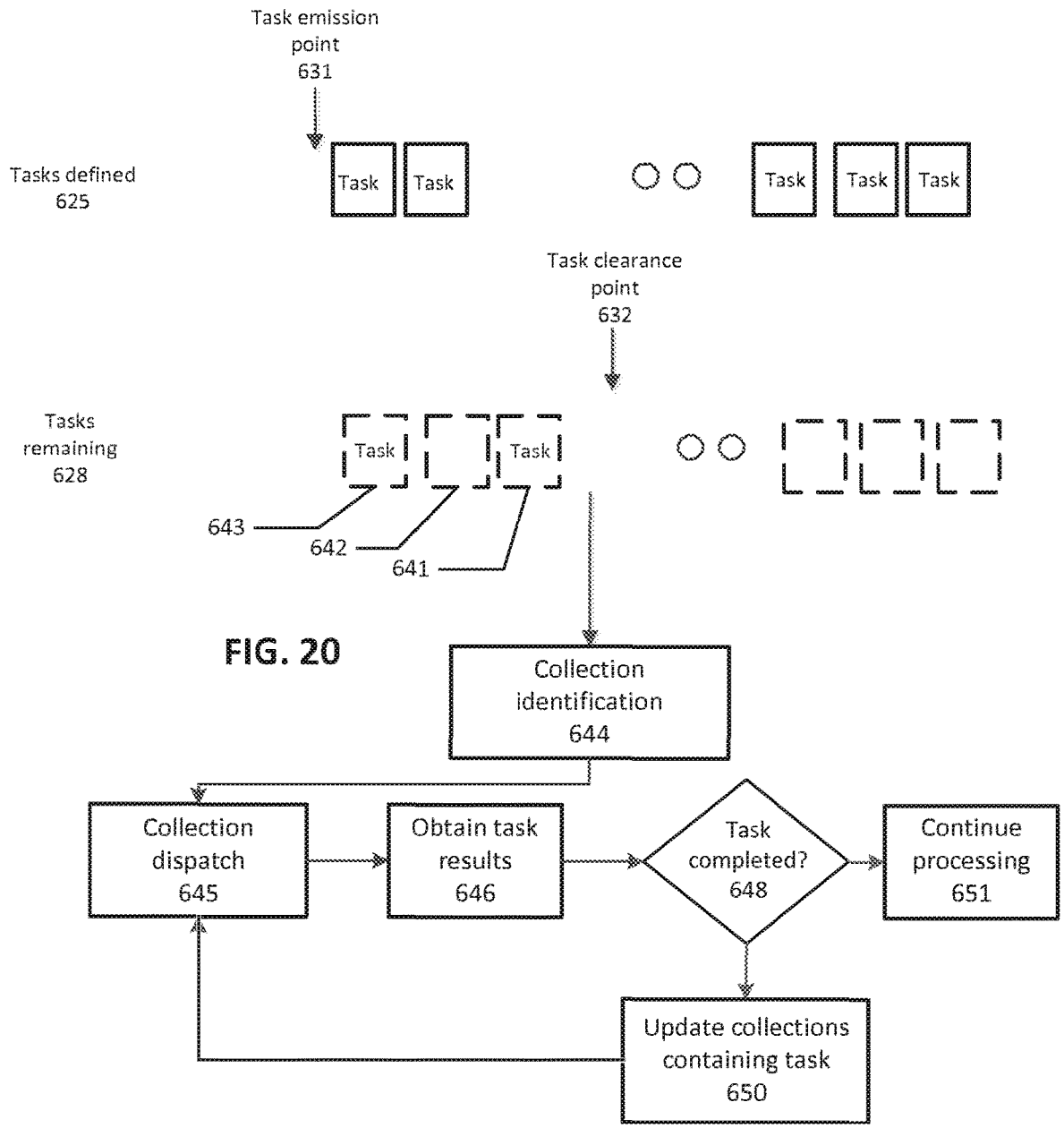
FIG. 20 depicts an example of implementing quality-of-service aware throughput computing.

FIG. 20 depicts an example of implementing quality-of-service aware throughput computing. As shown in FIG. 19, a task collector may produce collections of tasks that are to be execution on a set of computation elements. The task collector an establish groupings of tasks that can be executed concurrently for at least some portion of those tasks. The task collector can defer commencement of execution of particular tasks in favor of increasing throughput of completion of tasks as a whole. However, if tasks are selected for processing purely on throughput considerations, then certain tasks may fail to be completed on a timely basis. In the context of ray tracing, a relatively small number of rays may end up in seldom-visited portions of a 3-D scene. Thus, insufficient rays may be available to make a full collection for those portions, and so the rays may not be scheduled for further traversal, if a scheduling heuristic is made to select full collections in order to maximize computation parallelism. In a general computation scenario, a set of code modules, routines, or segments may have parts that are much more frequently visited than others. The execution of these elements of code may be scheduled by collecting requests for such execution and selecting collections based at least on respective numbers of requests collected for different elements of code. Here also, some requests may languish if scheduling is done purely on a throughput decision.

In one example, tasks that are defined (defined tasks defined 625) can be given increasing identifiers, starting from a task emission point 631. Tasks can be selected for, and processed for throughput considerations, but additionally, a task clearance point 632 can be maintained. Task clearance point 632 identifies a position in the sequence of identifiers at which all lower task identifiers are to be prioritized for completion. As depicted in FIG. 20, some tasks greater than task clearance point 632 may already have been completed (e.g., task 642). As point 632 moves, scheduler 733 of FIG. 19 may identify (644) collections in collection storage 718 that contain that task, select those collections for eviction, and dispatch (644) as a corresponding packet (e.g., in a fast packet queue, e.g. 735). Task results can be obtained (646), and based on those results, a decision as to whether a task has been completed is made. If the task is not completed, then further collections in which the task is to be put are selected/updated (650). If that task is complete, then processing can continue (651) for other tasks.

In a scheduling approach according to FIG. 20, scheduling can be performed primarily based on throughput, but ensure that a given task does not linger more than a pre-determined time (e.g., processor cycles) before it is advanced. Giving tasks higher priorities can be accomplished by giving that task a sequence identifier lower than what is being issued to other tasks, which causes the task to reach clearance point 632 sooner than it would have otherwise. A separate priority indicator can be maintained also, as explained above. In the specific context of animation, sequences of frames may be rendered. Task identifiers can include data relating to a frame number (e.g., absolute, or a relative number for frames in flight), that frame number can be used for prioritization. Classes of rays also can be prioritized by such techniques, such as rays coming from a certain shader module, a certain type of ray, and so on. Implementations can provide a latency cap for individual tasks or classes of tasks, rays or classes of rays. To generalize to computation tasks, classes of tasks, such as tasks originating from a particular source, or which reference a particular dataset can be given a particular latency cap. Other ways to relatively prioritize rays or tasks may be provided in implementations that generally prioritize throughput, but also avoid exceeding latency caps for individual elements of computation.

A number of tasks between task clearance point 632 and task emission point 631 can be selectable and can be modulated according to real-time system conditions. For example, if rendering is implemented on a processing system that also can intermittently perform more time-critical digital signal processing tasks, or where available memory is currently constrained, then task clearance point 632 can be made to follow more closely to emission point 631.

If implemented in firmware and/or software, functions may be represented as one or more instructions or code on a computer-readable medium, in one example, the media is non-transitory. Examples include a computer-readable medium encoded with a data structure and a computer-readable medium encoded with a computer program. Machine-readable media includes non-transitory machine readable media. Other kinds of media include transmission media. A non-transitory medium may be any tangible medium that can be accessed by a machine. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a machine.

Modern general purpose processors regularly require in excess of two billion transistors to be implemented, while graphics processing units may have in excess of five billion transistors. Such transistor counts are likely to increase. Designs have used these transistors to implement increasing complex functionality and to increase parallelism. As such, it becomes increasingly necessary to be able to describe or discuss technical subject matter concerning such processors, whether general purpose or application specific, at a level of detail appropriate to the technology being addressed. In general, a hierarchy of concepts is applied to allow those of ordinary skill to focus on details of the matter being addressed.

Describing portions of a design (e.g., different functional units within an apparatus or system) according to functionality provided by those portions is often an appropriate level of abstraction, rather than exhaustively describing implementations of such portions, since each of these portions may themselves comprise hundreds of thousands or millions of gates and millions, tens of millions or hundreds of millions of transistors. When addressing some particular feature or implementation of a feature within such portion(s), it may be appropriate to identify substituent functions or otherwise characterize some sub-portion of that portion of the design in more detail, while abstracting other sub-portions or other functions.

A precise logical arrangement of the gates and interconnect (a netlist) implementing a portion of a design (e.g., a functional unit) can be specified. However, how such logical arrangement is physically realized in a particular chip (how that logic and interconnect is laid out in a particular design) still may differ in different process technology and for a variety of other reasons. To the extent that circuitry implementing particular functionality may be differently within different contexts, disclosure of a particular circuit may not be particularly helpful. Also, many of the details concerning producing netlists for functional units as well as actual layout are determined using design automation, proceeding from a high level logical description of the logic to be implemented (e.g., a "hardware description language"). As such, it is often unnecessary and/or unhelpful to provide more detail concerning a portion of a circuit design than to describe the functionality to be provided.

The term "circuitry" does not imply a single electrically connected set of circuits. Circuitry may be fixed function, configurable, or programmable. In general, circuitry implementing a functional unit is more likely to be configurable, or may be more configurable, than circuitry implementing a specific portion of a functional unit. For example, a "test cell" or "limited programmability circuits" according to the disclosure can be less configurable than an Arithmetic Logic Unit (ALU) of a processor, in that an ALU typically performs a sequence of simple operations, whereas some implementations of limited programmability circuits would execute a pre-defined sequence of operations, which can be selected from a set of operations. Such operations may accept parameters, or may have some variations. In any case, an ALU can become a portion of circuitry for implementing each operation to implement a function, and thus effectively can be or become circuitry for implementing such function, when configured to perform or otherwise interconnected to perform each different operation. Such configuration may come from or be based on instructions, or microcode, for example.

For example, a "task collector" and "test cells" may be implemented by fixed function circuitry, by machine code configuring a configurable or programmable processing unit, such as a core or a set of programmable cores, or a combination thereof. In some implementations, fixed or limited configurability circuitry is used to implement task collectors and test cells according to the disclosure. Nevertheless, a programmable processing unit, as configured by the machine code, can become a test cell or task collector, where a person of ordinary skill would understand that these terms relate back to functionality disclosed in the specification.

In all such cases, describing portions of an apparatus or system in terms of its functionality conveys structure to a person of ordinary skill in the art. In the context of this disclosure, the term "unit" refers, in some implementations, to a class or group of circuitry that implements the functions or functions attributed to that unit. Such circuitry may implement additional functions, and so identification of circuitry performing one function does not mean that the same circuitry, or a portion thereof, cannot also perform other functions. In some circumstances, the functional unit may be identified, and then functional description of circuitry that performs a certain feature differently, or implements a new feature may be described. As such, a "unit" may be formed of one or more circuits that implement a function or functions, where one or more of the circuits may be composed of configurable or programmable logic elements. Examples of logic elements include portions of ALUs, and a combination of switches and interconnect that implement logical expressions, such as Boolean logic expressions.

In some cases, a structure or structures implementing a given unit or module may have permanent physical differences or adaptations compared with structure(s) implementing other modules or units within an apparatus or system. However, such structure(s) also may be produced by a temporary adaptation or configuration, such as one caused under program control, microcode, or other source of configuration.

Different approaches to design of circuitry exist, for example, circuitry may be synchronous or asynchronous with respect to a clock. Circuitry may be designed to be static or be dynamic. Different circuit design philosophies may be used to implement different functional units or parts thereof. Absent some context-specific basis, "circuitry" encompasses all such design approaches.

Although circuitry or functional units described herein may be most frequently implemented by electrical circuitry, and more particularly, by circuitry that primarily relies on a transistor implemented in a semiconductor as a primary switch element, this term is to be understood in relation to the technology being disclosed. For example, different physical processes may be used in circuitry implementing aspects of the disclosure, such as optical, nanotubes, micro-electrical mechanical elements, quantum switches or memory storage, magnetoresistive logic elements, and so on. Although a choice of technology used to construct circuitry or functional units according to the technology may change over time, this choice is an implementation decision to be made in accordance with the then-current state of technology. This is exemplified by the transitions from using vacuum tubes as switching elements to using circuits with discrete transistors, to using integrated circuits, and advances in memory technologies, in that while there were many inventions in each of these areas, these inventions did not necessarily fundamentally change how computers fundamentally worked. For example, the use of stored programs having a sequence of instructions selected from an instruction set architecture was an important change from a computer that required physical rewiring to change the program, but subsequently, many advances were made to various functional units within such a stored-program computer.

Functional modules may be composed of circuitry, where such circuitry may be fixed function, configurable under program control or under other configuration information, or some combination thereof. Functional modules themselves thus may be described by the functions that they perform, to helpfully abstract how some of the constituent portions of such functions may be implemented.

In some situations, circuitry and functional modules may be described partially in functional terms, and partially in structural terms. In some situations, the structural portion of such a description may be described in terms of a configuration applied to circuitry or to functional modules, or both.

The description of the aspects and features is provided to enable any person skilled in the art to make and use the systems, apparatuses and perform the methods disclosed. Various modifications will be readily apparent to those skilled in the art, and the principles described in this document may be applied to other aspects without departing from the spirit or scope of the disclosure. Thus, the description is not intended to limit the claims. Rather, the claims are to be accorded a scope consistent with the principles and novel features disclosed herein.

The drawings include relative arrangements of structure and ordering of process components, solely as an aid in understanding the description. These relative arrangements and numbering is not an implicit disclosure of any specific limitation on ordering or arrangement of elements and steps in the claims. Process limitations may be interchanged sequentially without departing from the scope of the disclosure, and means-plus-function clauses in the claims are intended to cover the structures described as performing the recited function that include not only structural equivalents, but also equivalent structures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than, additional to, or less than, those identified herein. Rather, the described features and steps are disclosed as examples of components of systems and methods within the scope of the appended claims.

What is claimed is:

1. A method of rendering an image of a 3-D scene using ray tracing, comprising:
    identifying an intersection between a ray and implicitly-defined geometry located in a 3-D scene, a location of the intersection expressed in a reference coordinate system for a bounding element that encloses the implicitly-defined geometry;
    identifying an intersection of the ray with explicitly-defined geometry, a location of the intersection with explicitly-defined geometry being expressed in a global coordinate system;
    transforming either the location of the intersection with implicitly-defined geometry into the global coordinate system or the location of the intersection with explicitly-defined geometry into the referenced coordinate system, and comparing which of the intersections is closer to an origin of the ray; and
    using a result of said comparing which of the intersections is closer to an origin of the ray to render an image of the scene.

2. The method of rendering of claim 1, further comprising accruing the intersections in a ray data structure and deferring the comparing.

3. The method of rendering of claim 1, wherein the comparing comprises using an identifier for source geometry to select one of the intersections, when neither of the intersections is closer to the origin of the ray than the other intersection.

4. The method of rendering of claim 1, wherein transforming either the location of the intersection with implicitly-defined geometry into the global coordinate system or the location of the intersection with explicitly-defined geometry into the referenced coordinate system comprises applying a transformation matrix to the location being transformed.

5. The method of rendering of claim 1, wherein the bounding element that encloses the implicitly-defined geometry is a trapping element.

6. The method of rendering of claim 1, wherein data is produced as a result of identifying an intersection between a ray and implicitly-defined geometry, the data comprising one or more of a closest intersection, barycentric coordinates, a distance to the intersection, and a point in 3-D space identifying an intersection point.

7. A ray tracing system for rendering an image of a 3-D scene, the ray tracing system comprising:
    one or more test cells configured to identify an intersection between a ray and implicitly-defined geometry located in a 3-D scene, a location of the intersection expressed in a reference coordinate system for a bounding element that encloses the implicitly-defined geometry;
    one or more test cells configured to identify an intersection of the ray with explicitly-defined geometry, a location of the intersection with explicitly-defined geometry being expressed in a global coordinate system; and
    one or more programmable circuits configured to transform either the location of the intersection with implicitly-defined geometry into the global coordinate system or the location of the intersection with explicitly-defined geometry into the referenced coordinate system, and comparing which of the intersections is closer to an origin of the ray;
    wherein a result of said comparing which of the intersections is closer to an origin of the ray is used for rendering an image of the scene.

8. The ray tracing system of claim 7, wherein the system is further configured to accrue the intersections in a ray data structure and defer the comparing.

9. The ray tracing system of claim 7, wherein the comparing comprises using an identifier for source geometry to select one of the intersections, when neither of the intersections is closer to the origin of the ray than the other intersection.

10. The ray tracing system of claim 7, wherein the one or more programmable circuits are configured to apply a transformation matrix to the location being transformed.

11. The ray tracing system of claim 7, wherein the bounding element that encloses the implicitly-defined geometry is a trapping element.

12. The ray tracing system of claim 7, wherein data is produced as a result of identifying an intersection between a ray and implicitly-defined geometry, the data comprising one or more of a closest intersection, barycentric coordinates, a distance to the intersection, and a point in 3-D space identifying an intersection point.

13. A non-transitory computer-readable storage medium having stored thereon computer readable instructions which, when executed by a processor, cause the processor to perform a method of rendering an image of a 3-D scene using ray tracing, the method comprising:
   identifying an intersection between a ray and implicitly-defined geometry located in a 3-D scene, a location of the intersection expressed in a reference coordinate system for a bounding element that encloses the implicitly-defined geometry;
   identifying an intersection of the ray with explicitly-defined geometry, a location of the intersection with explicitly-defined geometry being expressed in a global coordinate system; and
   transforming either the location of the intersection with implicitly-defined geometry into the global coordinate system or the location of the intersection with explicitly-defined geometry into the referenced coordinate system, and comparing which of the intersections is closer to an origin of the ray;
   wherein a result of said comparing which of the intersections is closer to an origin of the ray is used for rendering an image of the scene.

14. The non-transitory computer-readable medium of claim 13, wherein the method further comprises accruing the intersections in a ray data structure and deferring the comparing.

15. The non-transitory computer-readable medium of claim 13, wherein the comparing comprises using an identifier for source geometry to select one of the intersections, when neither of the intersections is closer to the origin of the ray than the other intersection.

16. The non-transitory computer-readable medium of claim 13, wherein transforming either the location of the intersection with implicitly-defined geometry into the global coordinate system or the location of the intersection with explicitly-defined geometry into the referenced coordinate system comprises applying a transformation matrix to the location being transformed.

17. The non-transitory computer-readable medium of claim 13, wherein the bounding element that encloses the implicitly-defined geometry is a trapping element.

18. The non-transitory computer-readable medium of claim 13, wherein data is produced as a result of identifying an intersection between a ray and implicitly-defined geometry, the data comprising one or more of a closest intersection, barycentric coordinates, a distance to the intersection, and a point in 3-D space identifying an intersection point.

* * * * *